(12) United States Patent
Lee et al.

(10) Patent No.: US 11,745,662 B2
(45) Date of Patent: Sep. 5, 2023

(54) ELECTROCHROMIC MIRROR MODULE

(71) Applicant: Unimicron Technology Corp., Taoyuan (TW)

(72) Inventors: An-Sheng Lee, Hsin-chu County (TW); Meng-Chia Chan, Hsin-chu County (TW); Ming-Yuan Hsu, Hsin-chu County (TW); Po-Ching Chan, Hsin-chu County (TW); Shih-Yao Lin, Hsin-chu County (TW); Cheng-Ming Weng, New Taipei (TW)

(73) Assignee: Unimicron Technology Corp., Taoyuan (TW)

( * ) Notice: Subject to any disclaimer, the term of this patent is extended or adjusted under 35 U.S.C. 154(b) by 529 days.

(21) Appl. No.: 16/999,039

(22) Filed: Aug. 20, 2020

(65) Prior Publication Data

US 2021/0155161 A1 May 27, 2021

(30) Foreign Application Priority Data

Nov. 27, 2019 (TW) .................................. 108143263
May 5, 2020 (TW) .................................. 109114917

(51) Int. Cl.
*B60R 1/08* (2006.01)
*G02F 1/153* (2006.01)
*G02F 1/155* (2006.01)
*G02F 1/157* (2006.01)
*G06F 3/041* (2006.01)

(52) U.S. Cl.
CPC .............. *B60R 1/088* (2013.01); *G02F 1/155* (2013.01); *G02F 1/157* (2013.01); *G02F 1/1533* (2013.01); *G06F 3/041* (2013.01); *G02F 2203/02* (2013.01)

(58) Field of Classification Search
CPC ....... B60R 1/088; G02F 1/1533; G02F 1/155; G02F 1/157; G02F 2203/02; G06F 3/041
USPC .......................................................... 359/265
See application file for complete search history.

(56) References Cited

U.S. PATENT DOCUMENTS

| | | |
|---|---|---|
| 5,073,012 A | 12/1991 | Lynam |
| 5,253,109 A | 10/1993 | O'Farrell et al. |
| 5,355,245 A | 10/1994 | Lynam |
| 8,643,481 B2 | 2/2014 | Campbell et al. |
| 8,730,553 B2 * | 5/2014 | De Wind .................. B60R 1/04 359/267 |
| 9,346,403 B2 | 5/2016 | Uken et al. |

(Continued)

FOREIGN PATENT DOCUMENTS

| | | |
|---|---|---|
| CN | 202743138 U | 2/2013 |
| CN | 110077321 A | 8/2019 |

(Continued)

*Primary Examiner* — Edward J Glick
*Assistant Examiner* — William D Peterson
(74) *Attorney, Agent, or Firm* — CKC & Partners Co., LLC

(57) ABSTRACT

An electrochromic mirror module including a light-transmissive substrate, an opaque touch sensing layer and an electrochromic device is provided. The light-transmissive substrate has a visible surface and a back surface disposed opposite to the visible surface. The opaque touch sensing layer and the electrochromic layer are disposed on the back surface. Distribution areas of the opaque touch sensing layer and the electrochromic layer are different on the back surface. An electrochromic mirror module including reflective layer and electrochromic device is also provided.

19 Claims, 15 Drawing Sheets

(56) References Cited

U.S. PATENT DOCUMENTS

| | | | |
|---|---|---|---|
| 2014/0022390 A1 | 1/2014 | Blank et al. | |
| 2015/0077828 A1* | 3/2015 | Kukita | B60R 1/04 359/266 |
| 2016/0167584 A1* | 6/2016 | Chan | B60R 1/088 359/267 |
| 2017/0297498 A1 | 10/2017 | Larson et al. | |
| 2018/0304727 A1 | 10/2018 | Choi et al. | |

FOREIGN PATENT DOCUMENTS

| | | | |
|---|---|---|---|
| TW | M509143 U | 9/2015 | |
| TW | M519600 U | 4/2016 | |
| TW | 201626083 A | 7/2016 | |
| TW | 201706692 A | 2/2017 | |
| TW | I574866 B | 3/2017 | |
| TW | I605962 B | 11/2017 | |
| TW | 201806803 A | 3/2018 | |
| WO | WO-2012051500 A1 * | 4/2012 | B60R 1/02 |
| WO | 2018225672 A1 | 12/2018 | |

* cited by examiner

ELECTROCHROMIC MIRROR MODULE

CROSS-REFERENCE TO RELATED APPLICATION

This application claims priority to Taiwan Application Serial Number 108143263, filed Nov. 27, 2019, and Taiwan Application Serial Number 109114917, filed May 5, 2020, which are herein incorporated by reference in their entirety.

BACKGROUND

Field of Disclosure

The present disclosure relates to an optical apparatus. More particularly, the present disclosure relates to an electrochromic mirror module.

Description of Related Art

Rearview mirror with electrochromic material is utilized in vehicles nowadays. In the existing electrochromic rearview mirror, the electrochromic material can provide a rearview with higher brightness during the day to observe rear vehicles, and increase the light absorption at night to provide an anti-glare function, so as to avoid that the lights of the rear vehicles affect driver's vision.

However, switch and adjusting buttons of the electrochromic rearview mirror are located on the bottom, which are hard to reach. Some of the electrochromic rearview mirror has switch and buttons located on the reflective surface, which are blocking the rearview vision of the driver. Therefore, how to provide an electrochromic rearview mirror with an appropriate control interface is one of the problems to be solved by people skilled in the art.

Also, the electrochromic material may also apply to wing mirrors, which are disposed on the exterior sides of the vehicle. However, how to further increase the function of the wing mirrors with electrochromic material is also one of the problems to be solved by those skilled in the art.

SUMMARY

An embodiment of the present disclosure provides an electrochromic mirror module including a first light-transmissive substrate, an opaque touch sensing layer, and an electrochromic device. The first light-transmissive substrate has a visible surface and a back surface disposed opposite to the visible surface. The opaque touch sensing layer is disposed on the back surface, and the electrochromic device is disposed on the back surface with the opaque touch sensing layer. On the back surface, the opaque touch sensing layer and the electrochromic device are disposed on different areas.

In an embodiment of the present disclosure, a distribution area of the opaque touch sensing layer on the back surface is corresponded to the peripheral of the visible surface, and rest of the visible surface is corresponded to the electrochromic device.

In an embodiment of the present disclosure, a distribution area of the opaque touch sensing layer on the back surface and a distribution area of the electrochromic device on the back surface overlap each other.

In an embodiment of the present disclosure, a shape of the visible surface is rectangle, and the visible surface has a top, a bottom and two sides. Length of the top and length of the bottom are longer than lengths of the two sides. Distribution area of the opaque touch sensing layer on the back surface is corresponded to an area of the visible surface near the bottom.

In an embodiment of the present disclosure, a distribution area of the opaque touch sensing layer on the back surface is corresponded to an area on the visible surface near one of the sides.

In an embodiment of the present disclosure, a distribution area of the opaque touch sensing layer on the back surface is corresponded to an area on the visible surface near the top.

In an embodiment of the present disclosure, a shape of the visible surface is round, oval, or polygonal.

In an embodiment of the present disclosure, the visible surface is a full mirror surface.

In an embodiment of the present disclosure, the electrochromic mirror module further includes a case. The case has a side wall surrounding the first light-transmissive substrate, and the side wall has a front casing surface which is aligned with the visible surface.

In an embodiment of the present disclosure, the visible surface is a plane or a curved surface.

In an embodiment of the present disclosure, the opaque touch sensing layer has a plurality of operation areas, and the operation areas are separate.

In an embodiment of the present disclosure, the electrochromic mirror module further includes a second light-transmissive substrate and a reflective substrate. The first light-transmissive substrate, the second light-transmissive substrate, and the reflective substrate are stacked, and the second light-transmissive substrate is disposed between the reflective substrate and the first light-transmissive substrate.

In an embodiment of the present disclosure, the opaque touch sensing layer has patterned metal electrode and connecting circuit. The patterned metal electrode is disposed on the back surface of the first light-transmissive substrate, and the patterned metal electrode has hollow area. The connecting circuit is electrically connected to the patterned metal electrode.

In an embodiment of the present disclosure, the patterned metal electrode is disposed on the back surface of the first light-transmissive substrate through coating, printing, laminating, or deposition.

In an embodiment of the present disclosure, the opaque touch sensing layer is disposed between the first light-transmissive substrate and the second light-transmissive substrate.

In an embodiment of the present disclosure, the electrochromic device includes a first controlling electrode, an electrochromic layer; and a second controlling electrode. The electrochromic layer is disposed between the first controlling electrode and the second controlling electrode.

In an embodiment of the present disclosure, the electrochromic mirror module further includes an adhesive layer. The adhesive layer and the opaque touch sensing layer are disposed between the first light-transmissive substrate and the electrochromic device.

In an embodiment of the present disclosure, an incident light from outside enters through the visible surface of the first light-transmissive substrate. The reflective substrate reflects the incident light, and the reflected incident light exit through the visible surface of the first light-transmissive substrate. The reflectance of the electrochromic mirror module is greater than 40%.

In an embodiment of the present disclosure, the reflective substrate has a reflective layer, and a material of the reflective layer includes silver, copper, aluminum, titanium, nickel, chromium, or molybdenum, or alloy combined with one or plurality of the materials above.

In an embodiment of the present disclosure, a material of the patterned metal electrode includes conductive material or coating material, and the coating material includes silver, copper, titanium, molybdenum, chromium, nickel, or aluminum, or alloy combined with one or plurality of the materials above.

In an embodiment of the present disclosure, the opaque touch sensing layer has a plurality of the patterned metal electrodes, and the patterned metal electrodes are separate.

In an embodiment of the present disclosure, edge of the visible surface has a right angle or a round angle.

In an embodiment of the present disclosure, a material of the first controlling electrode and a material of the second controlling electrode include indium tin oxide, indium zinc oxide, aluminum tin oxide, aluminum zinc oxide, indium gallium zinc oxide, or fluorine doped tin oxide, or complex material consists thereof.

As seen above, in an embodiment of the present disclosure, an electrochromic mirror module can provide control function with the opaque touch sensing layer.

In an embodiment of the present disclosure, the electrochromic device has a first controlling electrode, an electrochromic layer, and a second controlling electrode. An incident light from outside enters through visible surface of the first light-transmissive substrate, and the transmittance of the electrochromic layer is larger than 15%.

An embodiment of the present disclosure provides an electrochromic mirror module including a first light-transmissive substrate, a reflective layer, an electrochromic device, and first light-emitting device. The first light-transmissive substrate has a visible surface and a back surface. The back surface is disposed opposite to the visible surface, and the back surface has a first area and a second area. The reflective layer is disposed on the second area of the back surface. The reflective layer has at least one first opening. The electrochromic device is disposed on the first area of the back surface. The first light-emitting device is disposed on the first opening.

In an embodiment of the present disclosure, the second area of the back surface is corresponded to peripheral of the visible surface, and the first area of the back surface is corresponded to the rest of the visible surface.

In an embodiment of the present disclosure, the visible surface is a full mirror surface.

In an embodiment of the present disclosure, the electrochromic mirror module has a case. The case is connected to the back surface of the first light-transmissive substrate, and the case has an accommodation space, and the accommodation space accommodates the electrochromic device and the first light-emitting device.

In an embodiment of the present disclosure, the first light-emitting device is electrically connected to a first processor, and the first light-emitting device is adapted to receive a turn signal from the first processor.

In an embodiment of the present disclosure, the electrochromic mirror module includes a sensor. The reflective layer has a second opening, and the sensor is disposed on the second opening.

In an embodiment of the present disclosure, the electrochromic mirror module includes at least one second light-emitting device and a second processor. The second processor electrically connected to the sensor and the second light-emitting device. The reflective layer has at least one third opening. The second light-emitting device is disposed on the third opening. The second processor is adapted to receive an alert signal from the sensor, and the second processor provides a lighting signal to the second light-emitting device according to the alert signal.

In an embodiment of the present disclosure, the sensor includes an image sensor or a radar obstacle detector.

In an embodiment of the present disclosure, a material of the reflective layer includes a coating material, and the coating material includes silver, copper, titanium, molybdenum, aluminum, or alloy combined with one or plurality of the materials above.

In an embodiment of the present disclosure, the reflective layer is disposed on the back surface of the first light-transmissive substrate through coating, printing, laminating or deposition.

An embodiment of the present disclosure provides an electrochromic mirror module including a first light-transmissive substrate, a reflective layer, an electrochromic device, and at least one sensor. The first light-transmissive substrate has a visible surface and a back surface, the back surface is disposed opposite to the visible surface, and the back surface has a first area and a second area. The reflective layer is disposed on the second area of the back surface, and the reflective layer has at least one second opening. The electrochromic device is disposed on the first area of the back surface. The sensor is disposed on the second opening.

In an embodiment of the present disclosure, the electrochromic mirror module further includes at least one second light-emitting device and a second processor electrically connected to the sensor and the second light-emitting device. The reflective layer has at least one third opening, and the second light-emitting device is disposed on the third opening, and the second processor is adapted to receive an alert signal from the sensor, and the second process provide a lighting signal to the second light-emitting device according to the alert signal.

As seen above, an electrochromic mirror module of an embodiment of the present disclosure has a reflective layer having opening that can provide light signals or detect image or obstacle for drivers.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a schematic sectional view taken along the cutting plane line I in

FIG. 1;

DETAILED DESCRIPTION

Figure 1:
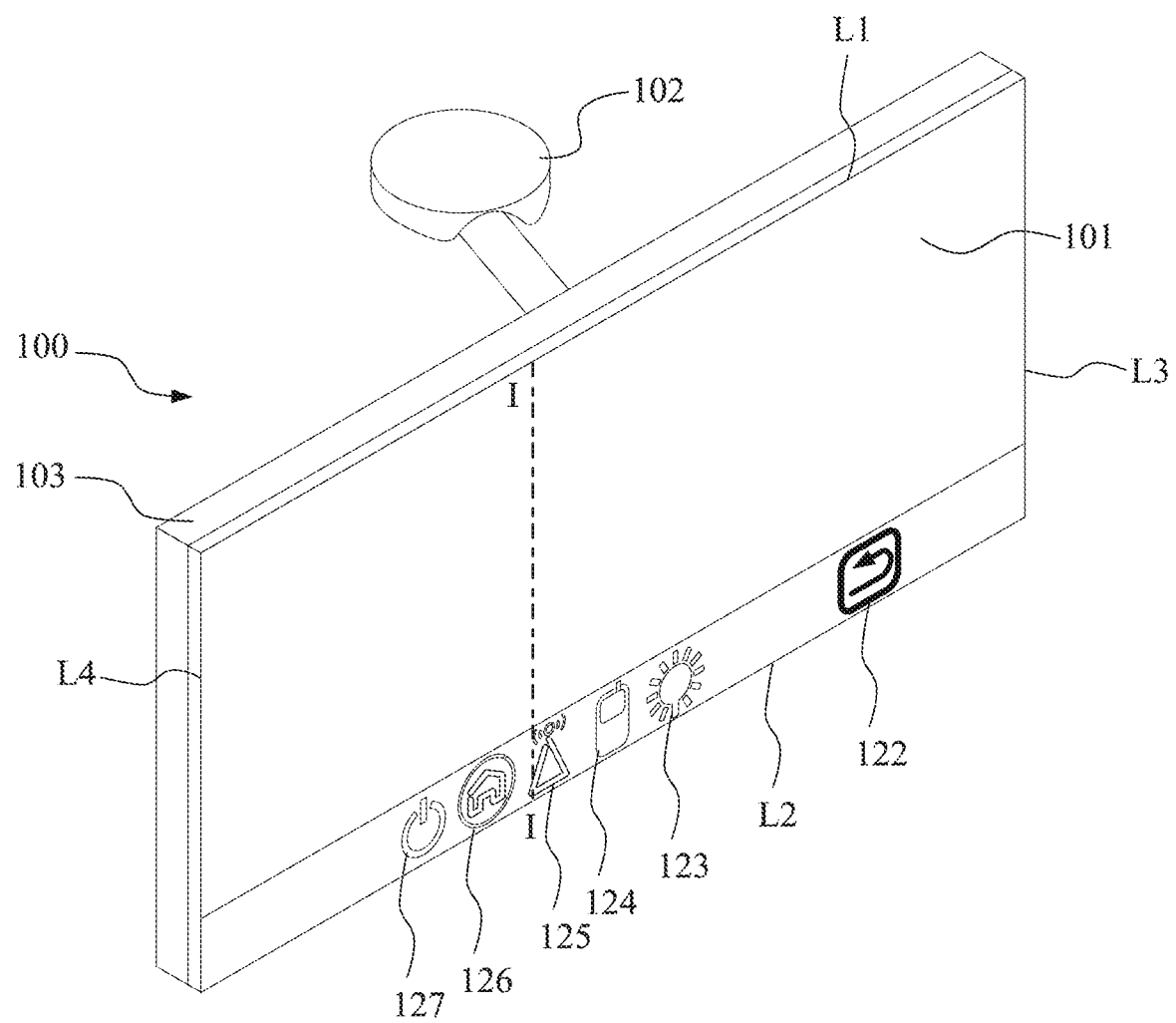
FIG. 1 is a schematic perspective view of an electrochromic mirror module according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

An electrochromic mirror module of an embodiment of the present disclosure can be applied to a vehicle. For example, an electrochromic mirror module of an embodiment of the present disclosure can be applied to rear-view mirror inside a car or rear-view mirrors on the external of the car, and the electrochromic mirror can also apply to rear-view mirror of other vehicles such as a scooter, or an electrical bicycle, but the disclosure is not limited thereto.

It should be understood that, though the technical words "the first", "the second", "the third" and etc. in the text can be used to describe different devices, components, areas, layers and/or parts, but the devices, components, areas, layers and/or parts should not be limited by these technical words. The technical words are used to differentiate one device, component, area, layer and/or part from others. Thus, "the first device", "the component," "the area," "the layer" and/or "the part" can also be called "the second device", "the component," "the area," "the layer" and/or "the part" without departing from the teaching herein.

FIG. 1 is a schematic perspective view of an electrochromic mirror module of an embodiment of the present disclosure. Please refer to FIG. 1, the electrochromic mirror module 100 of the embodiment of the present disclosure can provide a visible surface 101. The electrochromic mirror module 100 can be installed to a car, and a driver can see rearward through the visible surface 101. For example, the electrochromic mirror module 100 of the embodiment may include a connecting end 102, and the electrochromic mirror module 100 can be installed on a windshield of a car through the connecting end 102, but the present disclosure is not limited thereto.

In the embodiment, the connecting end 102 can be attached to the windshield through, for instance, adhesive, or external knob being able to couple with a fixing trench on the windshield, but the present disclosure is not limited thereto. The connecting end 102 can include, for instance, a shaft disposed on the side connecting to the windshield or the side connecting the electrochromic mirror module 100, and the shaft can be, for instance, a ball shaft, but the present disclosure is not limited thereto. Moreover, the present disclosure is not limited to shape and quantity of the connecting end, and people skilled in the art can modify the number and the shape of the connecting end 102 according to demand, so as to connect the electrochromic mirror module 100 to a windshield of car properly.

Moreover, please refer to FIG. 1, the electrochromic mirror module 100 of the present disclosure can include, for instance, a case 103. The case 103 of the present disclosure can wrap part of the electrochromic mirror module 100 located at the back of the visible surface 101. For example, the electrochromic mirror module 100 of the present disclosure can provide the visible surface 101 that is frameless, but the present disclosure is not limited thereto. In other embodiments, an electrochromic mirror module 100 can provide a framed visible surface 101. A material of the case 103 may include acrylic with higher hardness, or other materials which is adapted to support, but the present disclosure is not limited thereto. The present disclosure is not limited to the shapes, size, and the case 103 and the connection of the connecting end 102, and the following will further describe the detailed elements of the electrochromic mirror module 100.

Figure 2:
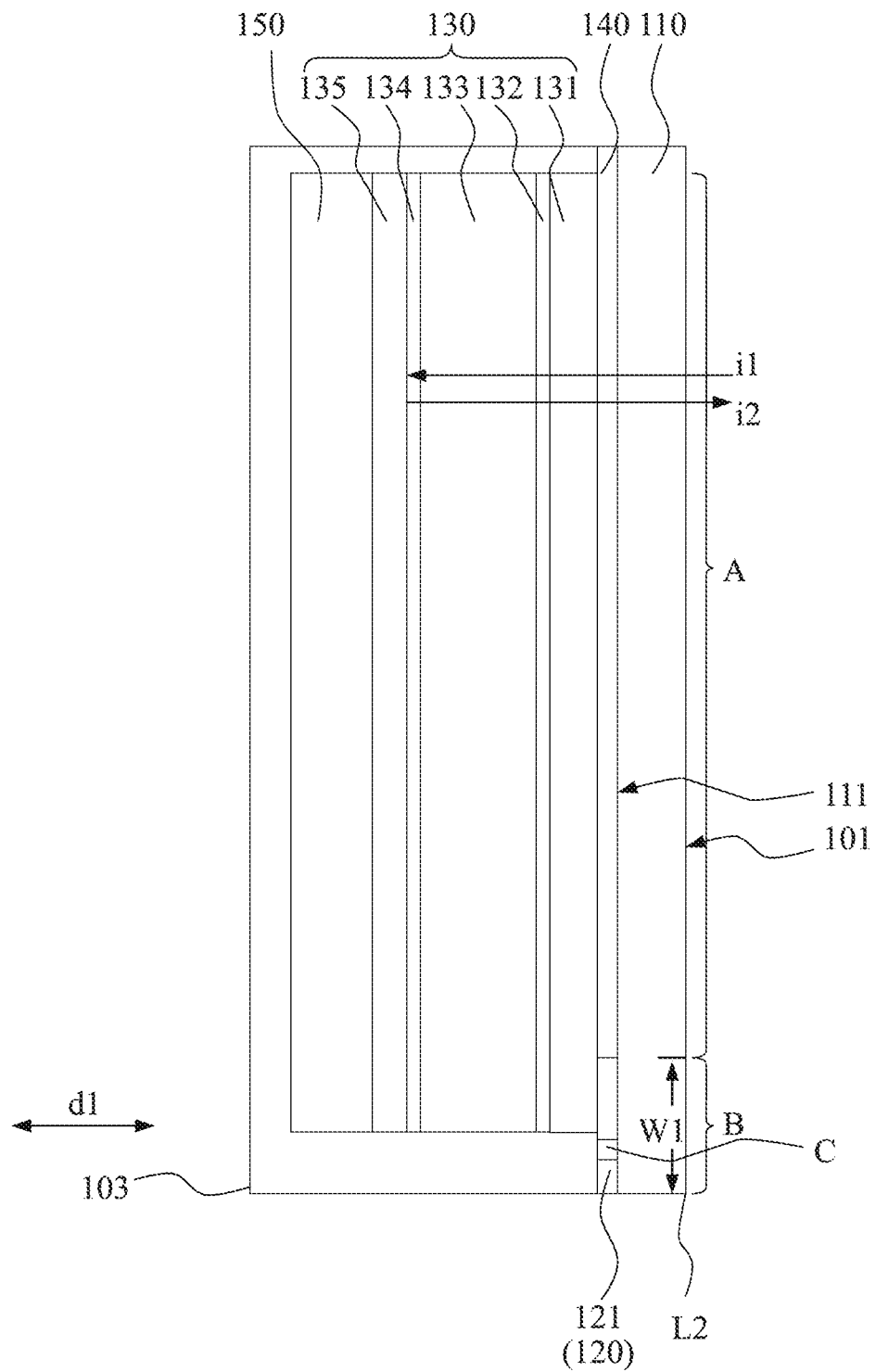

FIG. 2 is a sectional view taken along the cutting plane line I in FIG. 1. In the figures, the thickness of layers, films, panels, regions, etc., are exaggerated for clarity. Throughout the specification, the same reference numerals denote the same component. It will be understood that when a component such as a layer, a film, a region or a substrate is referred to as "on" or "connected to" another component, intermediate components can also be present. In contrast, when a component is referred to as "directly on" or "directly connected to" another component, no intermediate component can be present. As used herein, "connected" may refer to both physical and/or electrical connections. Furthermore, "electrical connection" or "coupled" may be the presence of other components between two elements.

Please refer to FIG. 2, in the embodiment, the electrochromic mirror module 100 includes a first light-transmissive substrate 110, an opaque touch sensing layer 120, and a electrochromic device 130. The first light-transmissive substrate 110 has a visible surface 101 and a back surface 111 disposed opposite to the visible surface 101. The opaque touch sensing layer 120 and the electrochromic device 130 are disposed on the back surface 111 of the first light-transmissive substrate 110. The opaque touch sensing layer 120 and the electrochromic device 130 are disposed on different areas of the back surface 111.

For example, distribution area of the opaque touch sensing layer 120 on the back surface 111 is corresponded to the peripheral of the visible surface 101, and the rest of the visible surface 101 is corresponded to the electrochromic device 130. In other embodiments of the present disclosure, on the back surface 111, area where the opaque touch sensing layer 120 is disposed and area where the electrochromic device 130 overlap each other, so as to provide touch sensing function on the visible surface 101 corresponded to the electrochromic device 130.

Peripheral of the said visible surface 101 includes, for instance, edge or corner areas of the visible surface 101, and the electrochromic device 130 can provide reflection image with high brightness or reflection image with low brightness. The electrochromic mirror module 100 of the embodiment can be a rearview mirror of a car, and the electrochromic mirror module 100 can provide touch function on the visible surface 101 with the opaque touch sensing layer 120, and a driver can control the electrochromic device 130 or other devices on the visible surface 101. Also, the driver can see rearward through the other area of the visible surface 101 with the electrochromic device 130.

For example, the visible surface 101 of the electrochromic mirror module 100 of the embodiment can be a plane, but the disclosure is not limited thereto. In other embodiments, the visible surface 101 of the electrochromic mirror module 100 can be plane or curved surface. In other embodiments of the present disclosure, the visible surface 101 of the electrochromic mirror module 100 can be a 2.5D surface. Moreover, a shape of the visible surface 101 is rectangle, but the disclosure is not limited thereto. In other embodiments of the present disclosure, shape of the visible surface 101 of the electrochromic mirror module 100 can be round, oval, or polygonal. Furthermore, peripheral of the visible surface 101 of the embodiment has right angle, but the disclosure is not limited thereto. In other embodiments, the peripheral of the visible surface 101 may have right angle, round angle (r angle), or 2.5D angle.

In other words, please refer to FIG. 2, the visible surface 101 of the present disclosure has a viewing area A and a operation area B. The operation area B is distributed at the peripheral of the visible surface 101, and the viewing area A covers center of the visible surface 101. In the embodiment, projection area of the opaque touch sensing layer 120 on the visible surface 101 is located in the operation area B, and projection area of the electrochromic device 130 on the visible surface 101 at least overlap the viewing area A. In the embodiment, the viewing area A and the operation area B on the visible surface 101 of the electrochromic mirror module 100 are separate, and, therefore; viewing area A won't be block while the driver is touching the operation area B, and driving safety can be further improved.

Moreover, visible surface 101 on the first light-transmissive substrate 110 of the embodiment can provide viewing and operation functions at the same time, and the case 103 of the electrochromic mirror module 100 can connect to the back surface 111 of the first light-transmissive substrate 110, and the electrochromic mirror module 100 can provide the visible surface 101 that is frameless, and visible experience of the driver can be improved, but the disclosure is not limited thereto. In other embodiments, the case 103 can provide a side wall surrounding the first light-transmissive substrate 110, and the side wall can has a front casing surface which is aligned with the visible surface 101, and the surface of the electrochromic mirror module 100 facing the driver can be a full flat surface.

To be specific, please refer to FIG. 1, the visible surface 101 of the embodiment is rectangle, includes top L1, bottom L2, and two sides L3, L4. A length of the top L1 and a length of the bottom L2 are longer than lengths of the two sides L3, L4. Please refer to FIG. 2, in the embodiment, distribution area of the opaque touch sensing layer 120 on the back surface 111 corresponds to an area on the visible surface 101 near the bottom L2.

Moreover, in the embodiment, while a driver sees the visible surface 101, the area corresponded to the opaque touch sensing layer 120 is located at the lower side of the visible surface 101, and an area of the visible surface 101 corresponded to the electrochromic device 130 will not be block by the driver's hands during operation.

For example, the area on the visible surface 101 that is corresponded to the opaque touch sensing layer 120 has a width W1 on a direction perpendicular to the bottom L2, and the width can be 6 millimeters (mm), but the disclosure is not limited thereto. In other embodiment, the area on the visible surface 101 corresponded to the opaque touch sensing layer 120 has a width W1 on a direction perpendicular to the bottom L2, and the width W1 is ranged from 6 mm to 10 mm. Also, the width W1 can be further increased as required. Therefore, the opaque touch sensing layer 120 can provide a good sensing area, without occupying too much area on the visible surface 101.

Moreover, a material of the first light-transmissive substrate 110 can include glass, but the disclosure is not limited thereto. In other embodiments, the material of the first light-transmissive substrate 110 can include light-transmissive acrylic, and the material of the first light-transmissive substrate 110 can also include a material absorbing light in specific spectrum, but the disclosure is not limited thereto.

Furthermore, in the embodiment, the opaque touch sensing layer 120 forms capacitors on the first light-transmissive substrate 110, and sensing signals can be generated while the driver's hand is touching the visible surface 101. For example, the electrochromic mirror module 100 of the embodiment can include a processor, and the processor is electrically connected to the opaque touch sensing layer 120, and the opaque touch sensing layer 120 can generate sensing signals according to the area where the driver touch through mutual capacitance or self-capacitance, but the disclosure is not limited thereto.

Please refer to FIG. 2, in the embodiment, the opaque touch sensing layer 120 can include patterned metal electrodes 121, and the patterned metal electrodes 121 are disposed on the back surface 111 of the first light-transmissive substrate 110, and the patterned metal electrodes 121 has hollow areas C, and the patterned metal electrodes 121 form a plurality of electrode patterns 122-127 as shown in FIG. 1 though the shape of hollow areas C. Please refer to FIG. 1, in the embodiment, the patterned metal electrodes 121 can be form into the electrode patterns 122-127, while the electrode pattern 127 may correspond to, for instance, power of the electrochromic device 130, and the electrode pattern 126 may correspond to the GPS (global positioning system) function of the car, and the electrode pattern 125 may correspond to wireless transfer function, and the electrode pattern 124 may correspond to hands-free calling, and the electrode pattern 123 may correspond to brightness adjustment, and the electrode pattern 122 may correspond to reset. Moreover, the electrochromic mirror module 100 can further electrically connect to a controller of the car, and controlling the mobile phone, wireless transferring module, or GPS through the touch function of the opaque touch sensing layer 120. In other words, the driver can control the electrochromic device 130 of the electrochromic mirror module 100 of the embodiment through the opaque touch sensing layer 120, and the driver can control other function of the car through this interface.

Moreover, the opaque touch sensing layer 120 of the embodiment of the disclosure can provide an easy and low-cost manufacturing method. The patterned metal electrode 121 of the embodiment and its connecting circuit can be form on the back surface 111 of the first light-transmissive substrate 110 through coating. For example, the patterned metal electrodes 121 and its connecting circuit can be form on the back surface 111 of the first light-transmissive substrate 110 through one photolithography process. Formation of the patterned metal electrodes 121 may include: forming a metal layer on the back surface 111 of the first light-transmissive substrate 110 through chemical vapor deposition or physical vapor deposition; pattering the metal layer through a photolithography with a mask, and forming hollow areas C in part of the metal layer. In other embodiment of the present disclosure, the hollow area C can further divide or cut the metal electrode into a plurality of separate touch operation areas, and forming the patterns according to every touch operation areas, so as to form a plurality of buttons and connection circuits thereof.

In other words, the buttons and the connection circuits of the opaque touch sensing layer 120 can be formed through one photolithography process. Therefore, the opaque touch sensing layer 120 can provide a proper control interface and a low cost manufacture method, and the total cost of the manufacture of the electrochromic mirror module 100 may also be reduced. Moreover, size, width, and position of the opaque touch sensing layer 120 may also be modified easily, and customization of the electrochromic mirror module 100 will be easier.

To be specific, in the embodiment, a material of the patterned metal electrode 121 can include aluminum, but the disclosure is not limited thereto. In other embodiment, the material of the patterned metal electrode 121 can include silver, gold, copper, titanium, molybdenum, chromium, nickel, platinum, or complex material consisting thereof. The formation of the patterned metal electrode 121 on the back surface 111 of the first light-transmissive substrate 110 includes coating or printing.

Moreover, since the opaque touch sensing layer 120 can include reflective material, the visible surface 101 can be a full mirror surface.

Please also refer to FIG. 1, in the embodiment, the electrode patterns 122-127 are arranged at the bottom side L2 of the visible surface 101, but the disclosure is not limited thereto. In other embodiment, the electrode patterns 122-127 can be arranged at the top side L1 of the visible surface 101.

Moreover, please refer to FIG. 2, in the embodiment, the electrochromic mirror module has an adhesive layer 140. The adhesive layer 140 and the opaque touch sensing layer 120 are both disposed between the first light-transmissive substrate 110 and the electrochromic device 130, and, therefore; the electrochromic device 130 can be bond to the first light-transmissive substrate 110.

Also, in the embodiment, the electrochromic device 130 has a first controlling electrode 132, electrochromic layer 133 and a second controlling electrode 134. The electrochromic layer 133 is disposed between the first controlling electrode 132 and the second controlling electrode 134. Distance between the first controlling electrode 132 and the first light-transmissive substrate 110 is shorter than distance between the second controlling electrode 134 and the first light-transmissive substrate 110.

For example, the first controlling electrode 132 and second controlling electrode 134 of the embodiment may include light-transmissive conductive material. The light-transmissive conductive material may include indium tin oxide, indium zinc oxide, aluminum tin oxide, aluminum zinc oxide, indium gallium zinc oxide, or fluorine doped tin oxide, or complex material consists thereof.

The electrochromic mirror module 100 apply voltage between the first controlling electrode 132 and the second controlling electrode 134, so as to form an electric field on the electrochromic layer 133. The electrochromic layer 133 has electrochromic material, and optical properties (reflectance, transmittance, or absorbance and etc.) can varied with the electric field in stable, reversible manners. Therefore, the first controlling electrode 132 and the second controlling electrode 134 can control the optical properties of the electrochromic layer 133. Furthermore, in the embodiment, the electrochromic layer 133 has reflectance that is larger than 40% corresponded to the incident light i1.

Moreover, in the embodiment, the electrochromic layer 133 has transmittance that is larger than 15% corresponded to the incident light i1.

For example, material of the electrochromic layer 133 of the embodiment is organic material. The organic material may be polymer such as EDOT, Viologen, or PMMA. In other embodiments of the present disclosure, the electrochromic layer 133 is self-illuminating material.

Moreover, the first controlling electrode 132, and the second controlling electrode 134 may include material chooses from indium tin oxide, indium zinc oxide, aluminum tin oxide, aluminum zinc oxide, indium gallium zinc oxide, or fluorine doped tin oxide, or complex material consists thereof.

Furthermore, in the embodiment, the electrochromic device 130 includes second light-transmissive substrate 131 and reflective substrate 135, and the reflective substrate 135 is corresponded to the second light-transmissive substrate 131. Distance between the second light-transmissive substrate 131 and visible surface 101 is shorter than distance between the reflective substrate 135 and visible surface 101. The first controlling electrode 132 is disposed on the surface of the second light-transmissive substrate 131 facing towards the electrochromic layer 133, and the second controlling electrode 134 is disposed on surface of the reflective substrate 135 facing towards the electrochromic layer 133. The incident light i1 can reach the electrochromic layer 133 through the second light-transmissive substrate 131, and the light passes through the electrochromic layer 133 can be reflected by the reflective substrate 135, so as to provide reflected light i2 with the electrochromic device 130.

For example, in the embodiment, the second light-transmissive substrate 131 may be glass substrate, and the reflective substrate 135 may be metal substrate or non-metallic substrate or glass substrate coated with metal, so as to provide a reflective surface. In other embodiment, the reflective substrate 135 may also be a reflective layer, and material of the reflective layer may include coating material. The coating material may include silver, copper, aluminum, titanium, molybdenum, or alloy combined with one or plurality of the materials above. The present disclosure is not limited to the material of the reflective substrate 135.

For another example, when the vehicle is driving in day time, the electrochromic layer 133 can lower the absorbance or increase reflectance by controlling electric field between the first controlling electrode 132 and the second controlling electrode 134, so as to increase the brightness of the reflected light i2, and the driver can clearly observe rear view of the vehicle. When the vehicle is driving in a dark environment, the electrochromic layer 133 can increase the absorbance and lower the reflectance by controlling electric field between the first controlling electrode 132 and the second controlling electrode 134, so as to reduce the brightness of the reflected light i2, and the driver can avoid glare from lights behind the vehicle, which may cause annoyance, discomfort, or vision damage.

Please refer to FIG. 2, in the embodiment, the electrochromic mirror module 100 can further include a carrier substrate 150, and the electrochromic device 130, the opaque touch sensing layer 120, and the first light-transmissive substrate 110 are disposed on the carrier substrate 150 along the direction d1 in series.

To be specific, the carrier substrate 150 may also be glass substrate or metal substrate, so as to provide proper support, but the disclosure is not limited thereto.

Figure 3:
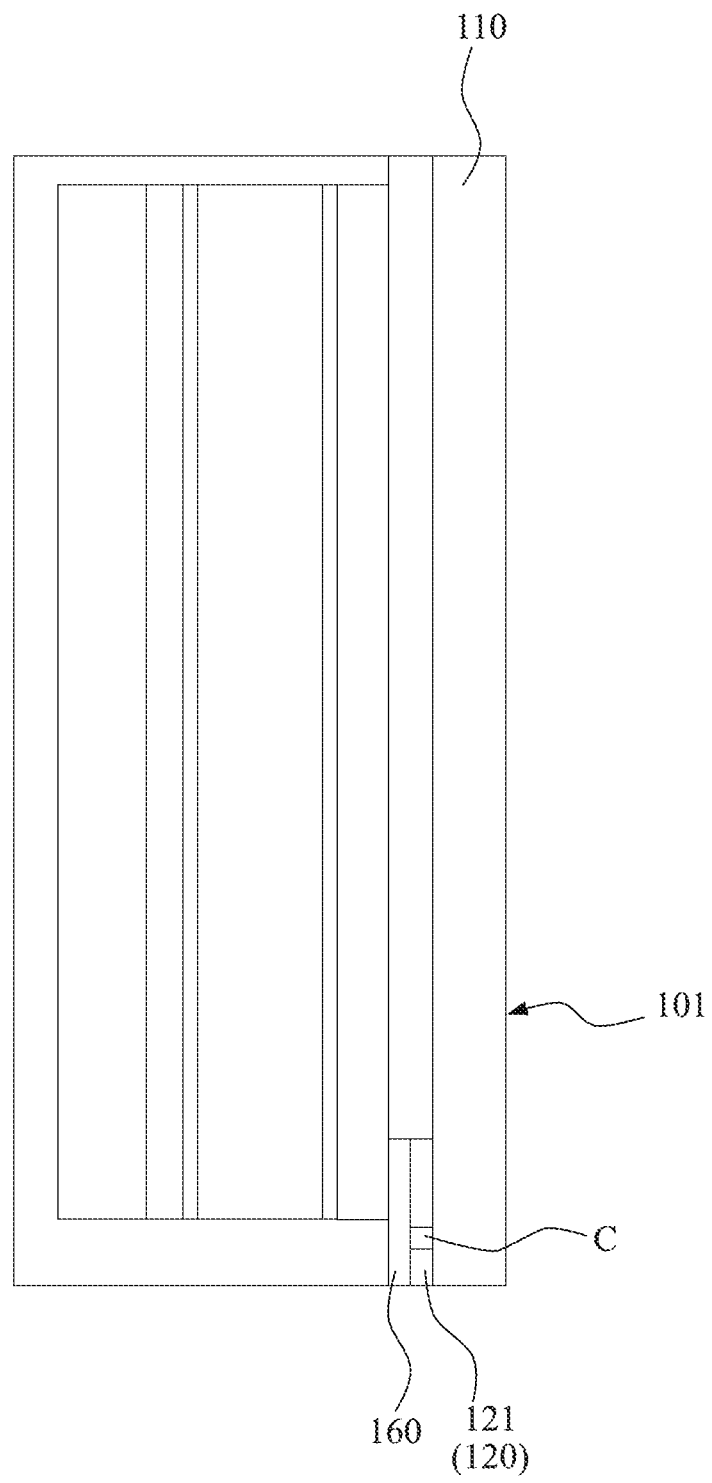
FIG. 3 is a schematic sectional view of an electrochromic mirror module according to another embodiment of the present disclosure.

In another embodiment of the present disclosure, the electrochromic mirror module can further include color layer. FIG. 3 is a sectional view of the electrochromic mirror module of another embodiment of the present disclosure. Please refer to FIG. 3, the electrochromic mirror module 100A is similar to the electrochromic mirror module 100 above, and descriptions of the same component will not be repeated. The electrochromic mirror module 100A further includes color layer 160. In the embodiment, the patterned metal electrode 121 of the opaque touch sensing layer 120 is disposed between the color layer 160 and the first light-transmissive substrate 110. For example, color of the color layer 160 may be white, and part of the color layer 160 may be visible in hollow area C of the patterned metal electrode 121. Driver may see white color in hollow area C of the patterned metal electrode 121 through the visible surface 101 of the first light-transmissive substrate 110, and the shape of the patterned metal electrode 121 may be even more visible.

In another embodiment of the present disclosure, color layer 160 of the electrochromic mirror module 100A may include light-emitting device. The light-emitting device may be light emitting diode (LED), but the disclosure is not limited thereto. The light-emitting device of the color layer 160 located behind the patterned metal electrode 121 may provide backlight, and the light can reach the visible surface 101 through the hollow area C, and, therefore; shape of the patterned metal electrode 121 can be readable in dark environment. Moreover, light-emitting device of the color layer 160 can provide different light in different position, so that the driver can more clearly recognize the shape of the patterned metal electrode.

For example, material of the patterned metal electrode 121 may include conductive material or coating material. The coating material may include silver, copper, titanium, molybdenum, aluminum, or alloy combined with one or plurality of the materials above.

Figure 4:
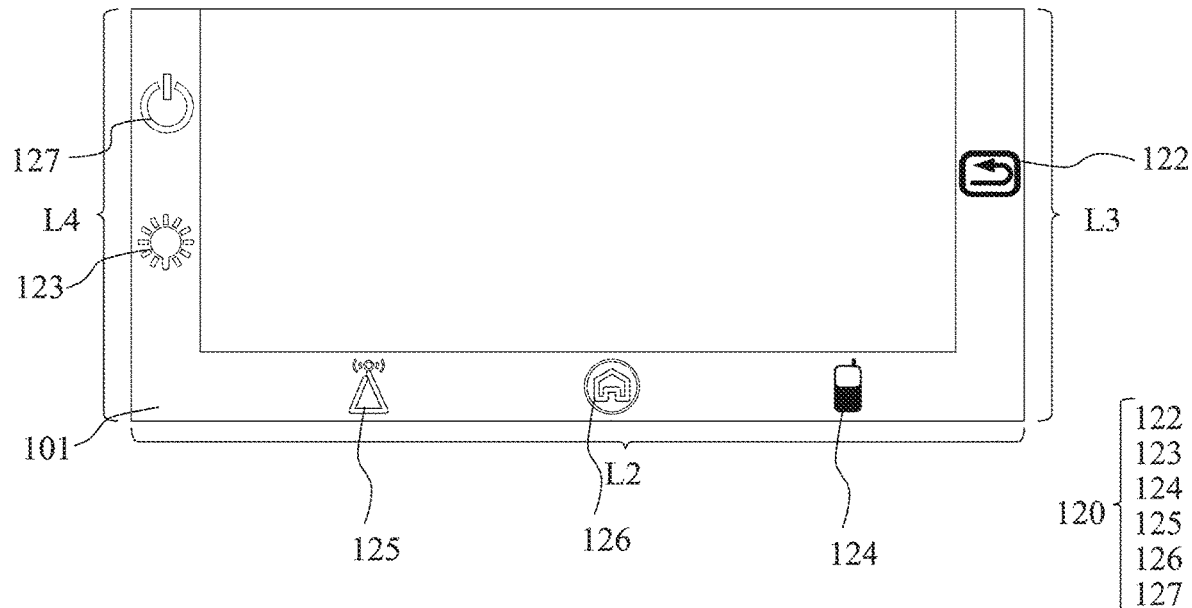
FIG. 4 is a schematic plan view of an electrochromic mirror module according to yet embodiment of the present disclosure.

In still another embodiment, opaque touch sensing layer of the electrochromic mirror module can be disposed in different manner. FIG. 4 is plan view of the electrochromic mirror module 100B of still another embodiment of the present disclosure. Please refer to FIG. 4, the electrochromic mirror module 100B is similar to the electrochromic mirror module 100 above, and descriptions of the same components will not be repeated. Distribution areas of the opaque touch sensing layer 120 on the back surface are corresponded to areas near two sides L3, L4 of the visible surface 101.

To be specific, please refer to FIG. 4, in the embodiment, the position on the visible surface 101 being corresponded to the opaque touch sensing layer 120 forming the electrode patterns 122-127 can be adjacent to the side L4, the bottom L2, and the side L3 far away from the driver. The electrode pattern 123-127 which may be reachable can be locate adjacent to the side L4 or the bottom L2, and the electrode pattern 122 that should be avoided by accidental activation can be located adjacent to side L3.

Figure 5:
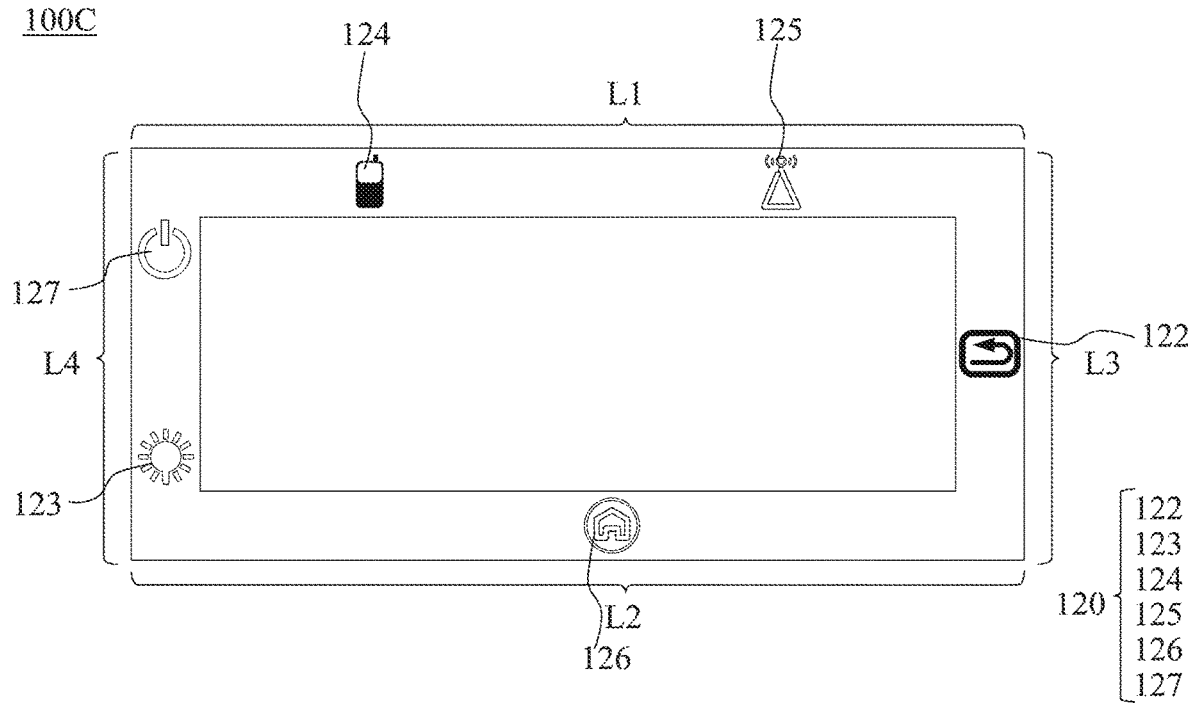
FIG. 5 is a schematic plan view of an electrochromic mirror module according to yet another embodiment of the present disclosure.

In yet another embodiment, opaque touch sensing layer of an electrochromic mirror module can be disposed in different manner. FIG. 5 is plan view of electrochromic mirror module of yet another embodiment. Please refer to FIG. 5, the electrochromic mirror module 100C is similar to the electrochromic mirror module 100B above, and descriptions of the same components will not be repeated. Distribution areas of the opaque touch sensing layer 120 on the back surface are corresponded to areas near top L1 of the visible surface 101.

Please refer to FIG. 5, in the embodiment, the electrode patterns 122-127 of the opaque touch sensing layer 120 can corresponded to area of the visible surface 101 that is adjacent to the top L1, which is far from driver. Therefore, operation may be further avoid during driving. For example, corresponded area of electrode pattern 124 for phone calls and electrode pattern 125 for wireless transmitting can be adjacent to the top L1, reminding the driver not to use these functions during driving, so as to improve safety. In the embodiment, the electrode patterns 122-127 are spaced with different distance on the top L1, bottom L2, and the sides L3, L4 of the visible surface 101, but the disclosure is not limited thereto. In other embodiment, the electrode patterns 122-127 may be spaced with the same distance on the top L1, bottom L2, and the sides L3, L4 of the visible surface 101.

Figure 6:
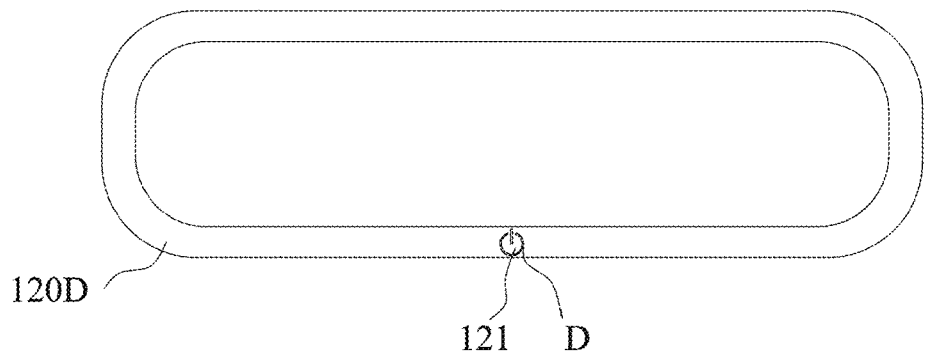
FIG. 6 is a schematic plan view of an electrochromic mirror module according to another embodiment of the present disclosure.

FIG. 6 is a plan view of an electrochromic mirror module of another embodiment of the present disclosure. Please refer to FIG. 6, in the embodiment, opaque touch sensing layer 120D of the electrochromic mirror module 100D has a continuous operation area. The opaque touch sensing layer 120D may further include patterned metal electrode 121, which is patterned with hollow areas D. The opaque touch sensing layer 120D has a continuous operation area, so as to provide an easy operation for driver.

Figure 7:
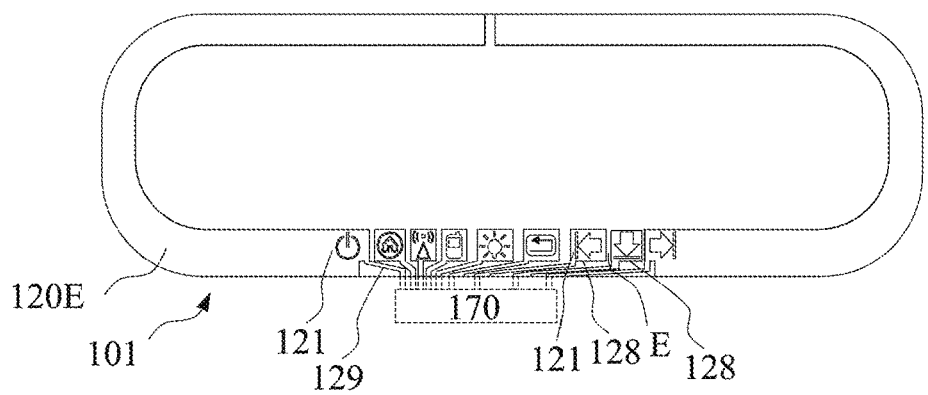
FIG. 7 is a schematic plan view of an electrochromic mirror module according to yet embodiment of the present disclosure.

FIG. 7 is a plan view of the electrochromic mirror module of still another embodiment of the present disclosure. Please refer to FIG. 7, in the electrochromic mirror module 100E, the opaque touch sensing layer 120E has separate operation areas 128, which are gapped with hollow areas E. The opaque touch sensing layer 120E has a plurality of patterned metal electrode 121, which are disposed in the operation areas 128 respectively.

For example, in the embodiment, the opaque touch sensing layer 120E further includes connecting circuits 129 electrically connected to the patterned metal electrodes 121, the patterned metal electrode 121 are electrically connected to inner parts of the electrochromic mirror module 100E or processor 170 in vehicle, so as to process the touch signal from the electrochromic mirror module 100E through the processor 170. The connecting circuits 129 are shown enlarged for ease of explanation, but it's not to limit the position or size of the connecting circuits 129 of the embodiment, and the connecting circuits will be omitted in other figures to clearly illustrate other components of other embodiments.

Figure 8:
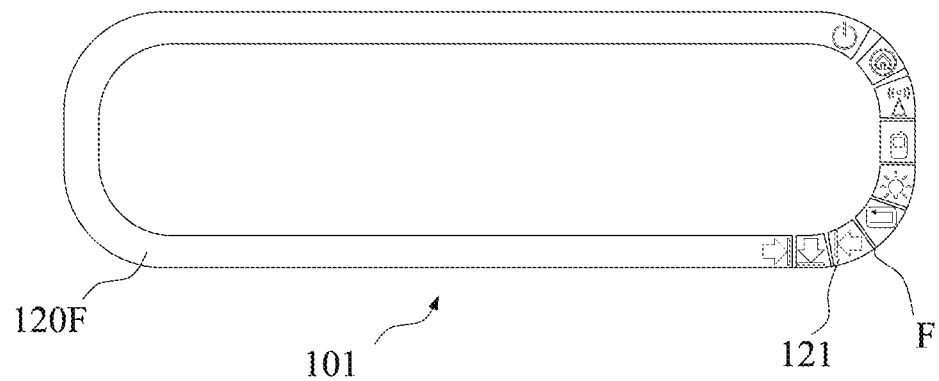
FIG. 8 is a schematic plan view of an electrochromic mirror module according to yet another embodiment of the present disclosure.

FIG. 8 is plan view of electrochromic mirror module of yet another embodiment. Please refer to FIG. 8, in the embodiment, patterned metal electrodes 121 of opaque touch sensing layer 120F of the electrochromic mirror module 100F are disposed on the right side of the visible surface 101, and hollow areas F are located among the patterned metal electrodes 121, so as to provide a separate operation areas with the opaque touch sensing layer 120F. In other embodiment of the present disclosure, the patterned metal electrodes 121 can be disposed on the left of the visible surface, but the present disclosure is not limited thereto.

Figure 9:
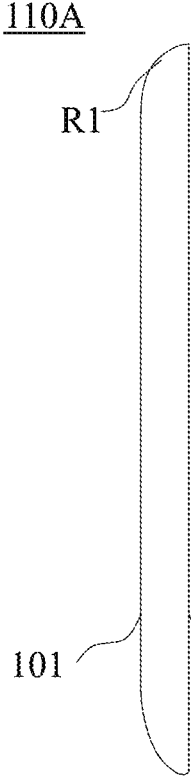
FIG. 9 to FIG. 11 are schematic sectional views of electrochromic mirror modules according to other embodiments of the present disclosure.
Figure 10:
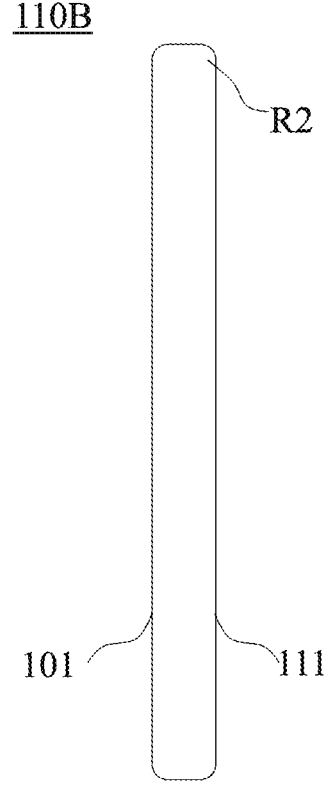
Figure 11:
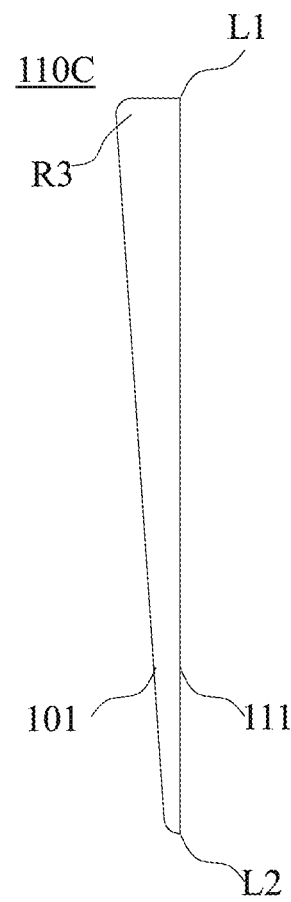

FIGS. 9-11 are section view of the first light-transmissive substrate of other embodiments. In the embodiments above, edge of the visible surface 101 has right angle, but the present disclosure is not limited thereto. Please refer to FIG. 9, in an embodiment of the present disclosure, edge connecting visible surface 101 and back surface 111 of first light-transmissive substrate 110A forms round angle R1 at a side near the visible surface 101, and the back surface 111 is disposed opposite to the visible surface 101. Please refer to FIG. 10, in another embodiment of the present disclosure, edge connecting visible surface 101 and back surface 111 of the first light-transmissive substrate 1108 form round angle R2 at a side near the back surface 111, and the back surface 111 is disposed opposite to the visible surface 101. Please refer to FIG. 11, in still another embodiment, distance between the visible surface 101 and the back surface 111 can be reduced towards the bottom L2, and the back surface 111 is disposed opposite to the visible surface 101, and round angle R3 can be form at the top L1 with the visible surface 101 and the back surface 111.

To sum up, an electrochromic mirror module of an embodiment of the present disclosure can provide a operable interface on periphery of a visible surface with an opaque touch sensing layer, and the manufacture of the module is easy, and an observation area is provided at area in the visible surface corresponded to the electrochromic device, and the observation area won't be affected by operation area at periphery of the visible surface.

Figure 12:
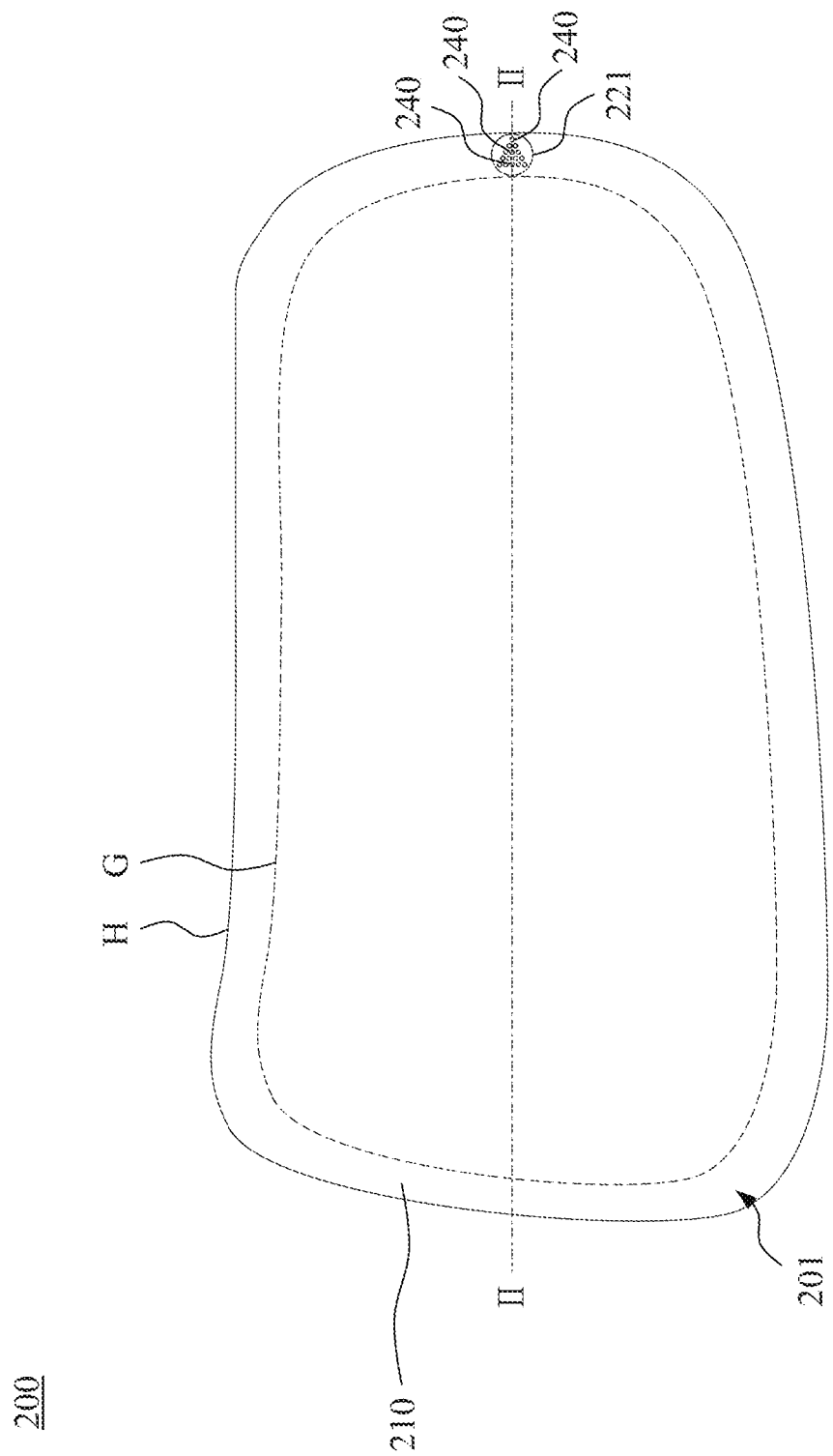
FIG. 12 is a schematic plan view of an electrochromic mirror module according to one embodiment of the present disclosure.
Figure 13:
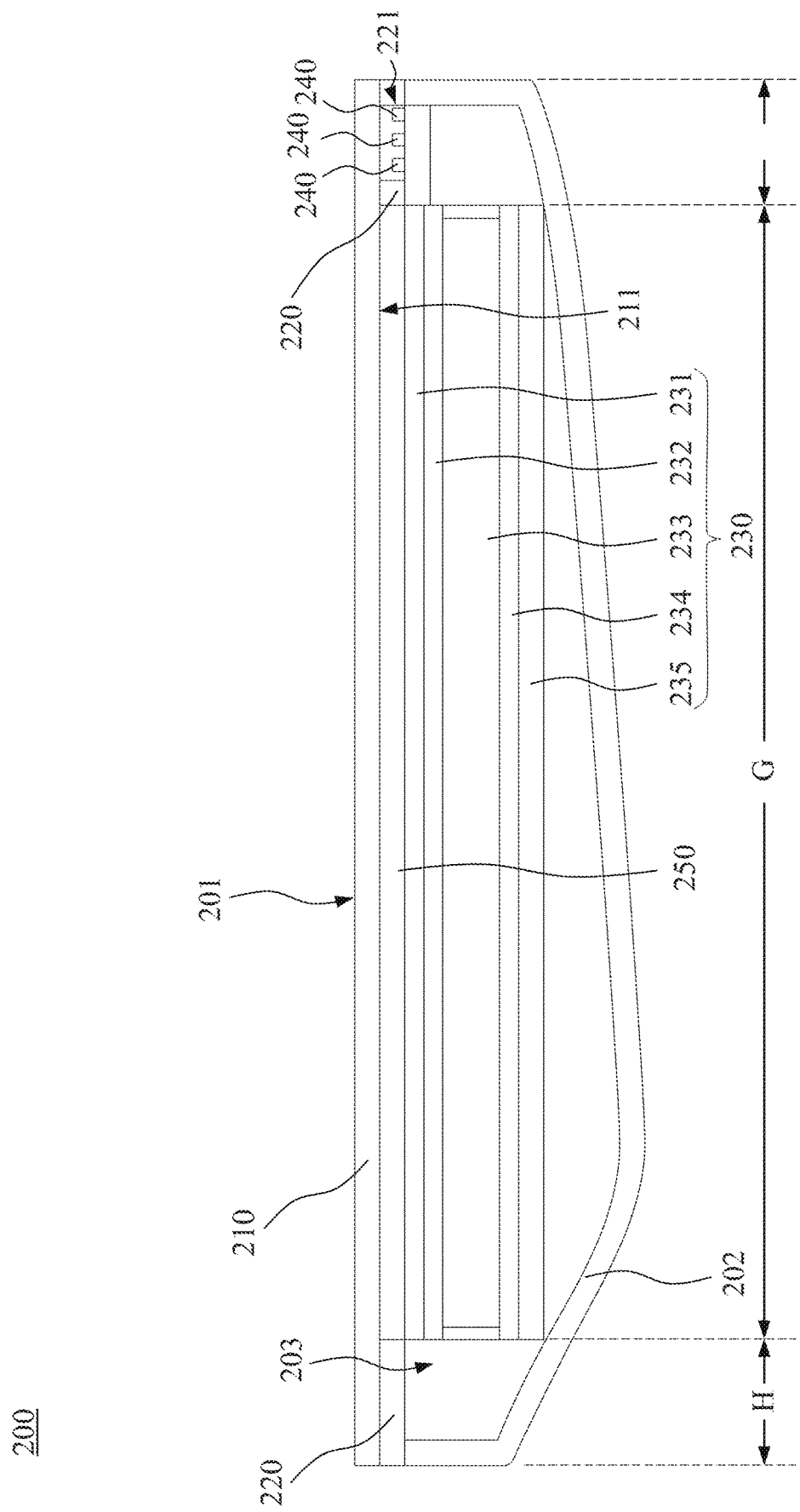
FIG. 13 is a schematic sectional view of the electrochromic mirror module taken along the cutting plan line II in FIG. 12.

FIG. 12 is a plan view of an electrochromic mirror module 200 of an embodiment of the present disclosure, and components below the first light-transmissive substrate 210 are illustrated with solid lines. FIG. 13 is a sectional view taken along the cutting plan line II in FIG. 12. Please refer to FIG. 12, and FIG. 13, the electrochromic mirror module 200 has a first light-transmissive substrate 210, reflective layer 220, electrochromic device 230 and a first light-emitting device 240.

The first light-transmissive substrate 210 has a visible surface 201 and a back surface 211. The back surface 211 is disposed opposite to the visible surface 201, and the visible surface 201 is facing towards the outside of the electrochromic mirror module 200, and the back surface 211 is located opposite to the visible surface 201, which is the opposite side of the first light-transmissive substrate 210, and the back surface 211 is facing towards the inner parts of the electrochromic mirror module 200.

Please refer to FIG. 12 and FIG. 13, the back surface 211 has a first area G (illustrated with dash in FIG. 12) and second area H. Reflective layer 220 is disposed on the second area H of the back surface 211. Reflective layer 200 has first openings 221. The electrochromic device 230 is disposed on the first area G of the back surface 211. The first light-emitting device 240 is disposed at the first openings 221 of the reflective layer 220.

To be specific, the reflective layer 220, the electrochromic device 230 and the first light-emitting device 240 are located at the same side of the first light-transmissive substrate 210, and the reflective layer 220, the electrochromic device 230, and the first light-emitting device 240 are adjacent to the back surface 211 of the first light-transmissive substrate 210.

Light from the first light-emitting device 240 can reach the first light-transmissive substrate 210 through the first openings 221 of the reflective layer 220, and emits through visible surface 201 of the first light-transmissive substrate 210. The first light-emitting device 240 is disposed at the first openings 221 of the reflective layer 220, and the reflective layer 220 and the electrochromic device 230 are disposed on different areas of the back surface 211 of the first light-transmissive substrate 210, and, therefore; the light from the first light-emitting device 240 won't affect the electrochromic device 230, and provides a proper image to driver.

Moreover, material of the reflective layer 220 has silver, but the disclosure is not limited thereto. In other embodiments of the present disclosure, the reflective layer 220 may include coating material. The coating material may include silver, copper, titanium, molybdenum, aluminum, or alloy combined with one or plurality of the materials above. The reflective layer 220 is disposed on the back surface 211 of the first light-transmissive substrate 210 through coating, but the disclosure is not limited thereto. In other embodiments, the reflective layer 220 can be disposed to the back surface 211 of the first light-transmissive substrate 210 through lamination, printing, or deposition.

To be specific, the electrochromic mirror module 200 may include a plurality of first light-emitting devices 240, and the first light-emitting devices 240 can be arranged in each of the first openings 221. The first light-emitting devices 240 are arranged in the first opening 221, and light from the first light-emitting devices 240 can form an illuminating pattern on the visible surface 201.

For example, the electrochromic mirror module 200 of the embodiment can be disposed on the outside of the vehicle, and the electrochromic mirror module 200 is disposed in the vision of driver. In each of the first openings 221, the first light-emitting devices 240 emit light and form a turning pattern on the visible surface 201. Therefore, the electrochromic mirror module 200 can provide turn signal.

Please refer to FIG. 12 and FIG. 13, the second area H of the back surface 211 is corresponded to the peripheral of the visible surface 201. The first area G of the back surface 211 is corresponded to the rest of the visible surface 201. The second area H of the back surface 211 of the embodiment surrounds the first area G. The first openings 221 are formed in the second area H of the reflective layer 220, and the position of the first light-emitting device 240 won't be affected by the electrochromic device 230 in driver's vision.

Furthermore, the visible surface 201 is a full mirror surface. The electrochromic mirror module 200 of the embodiment may further include a case 202. The case 202 is connected to the back surface 211 of the first light-transmissive substrate 210. The case 202 has an accommodation space 203, and the accommodation space 203 accommodates the electrochromic device 230 and the first light-emitting device 240. The accommodation space 203 is located between the case 202 and the first light-transmissive substrate 210, and connecting position of the case 202 on the first light-transmissive substrate 210 doesn't exceed distribution area of the back surface 211.

Please refer to FIG. 13, visible surface 201 of the electrochromic mirror module 200 is a flat surface, but the present disclosure is not limited thereto. In other embodiments, visible surface 201 of the electrochromic mirror module 200 can be curved.

Moreover, the electrochromic device 230 has a second light-transmissive substrate 231, a first controlling electrode 232, an electrochromic layer 233, a second controlling electrode 234, and a rear substrate 235.

The second light-transmissive substrate 231 is adjacent to the first light-transmissive substrate 210, and the first controlling electrode 232 is disposed on the second light-transmissive substrate 231. The first controlling electrode 232 may be light-transmissive electrode. Moreover, material of the first controlling electrode 232 may include indium tin oxide, but the disclosure is not limited thereto. In other embodiments, material of the first controlling electrode 232 can include indium tin oxide, indium zinc oxide, aluminum tin oxide, aluminum zinc oxide, indium gallium zinc oxide, or fluorine doped tin oxide, or complex material consists thereof.

The electrochromic layer 233 is disposed between the first controlling electrode 232 and the second controlling electrode 234. The electrochromic mirror module 200 can apply voltage to the first controlling electrode 232 and the second controlling electrode 234, so as to form an electric field on the electrochromic layer 233, and the transmittance of the electrochromic layer 233 can be adjust.

The electrochromic layer 233 is located between the second light-transmissive substrate 231 and the rear substrate 235. The second controlling electrode 234 is disposed on the rear substrate 235, and the second controlling electrode 234 is a reflective electrode. For example, material of the second controlling electrode 234 may include metal.

Moreover, materials of the second light-transmissive substrate 231 and the rear substrate 235 may include glass or plastic, but the disclosure is not limited thereto.

Therefore, the electrochromic mirror module 200 can apply voltage on the first controlling electrode 232 and the second controlling electrode 234, so as to control the light transmittance of the electrochromic device 230.

The electrochromic mirror module 200 has an adhesive layer 250. The adhesive layer 250 is disposed between the first light-transmissive substrate 210 and the electrochromic device 230, and the adhesive layer 250 connects the electrochromic device 230 to the first light-transmissive substrate 210.

The adhesive layer 250 and the reflective layer 220 are both disposed on the back surface 211 of the first light-transmissive substrate 210. The adhesive layer 250 is disposed in the first area G of the back surface 211, and the reflective layer 220 is disposed in the second area H of the back surface 211. The reflective layer 220 and the adhesive layer 250 may be located at different position on the first light-transmissive substrate 210.

Figure 14:
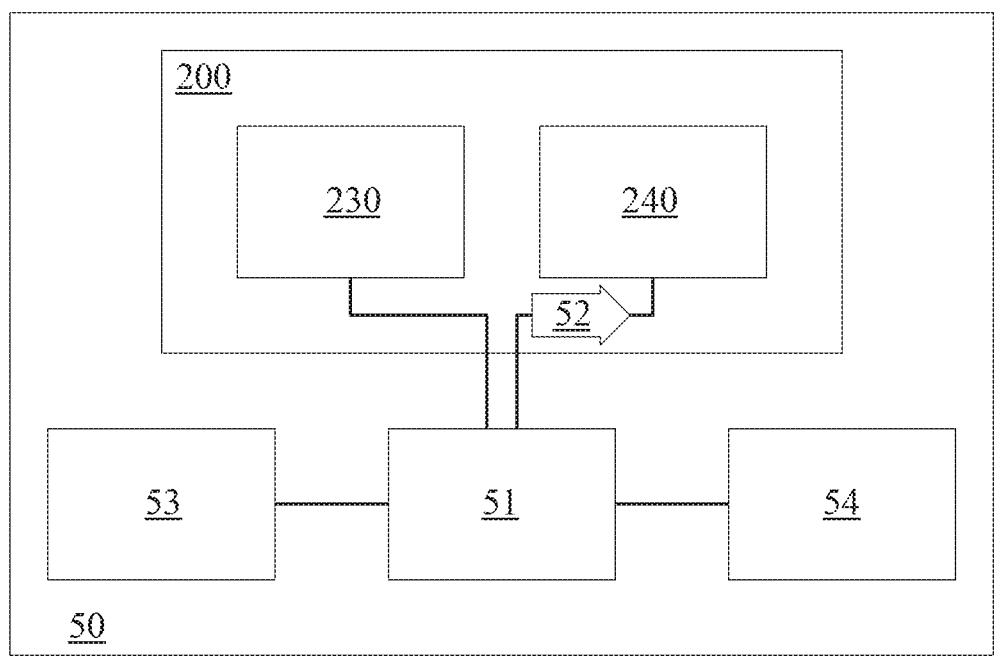
FIG. 14 is a schematic block diagram of an electrochromic mirror module of an embodiment of the present disclosure.

FIG. 14 is a block diagram of an electrochromic mirror module 200 of an embodiment of the present disclosure. Please refer to FIG. 14, the electrochromic mirror module 200 has the electrochromic device 230 and a first light-emitting device 240. The first light-emitting device 240 is electrically connected to first processor 51. The first light-emitting device 240 is adapted to receive a turn signal from the first processor 51.

To be specific, the first processor 51 can be central processing unit (CPU) or engine control unit (ECU) of a vehicle. When driver switches a turn signal level 53 of the vehicle 50, the first processor 51 can turn on the blinker 54 and provide a turn signal 52 to the first light-emitting device 240, and turning indicator of the vehicle 50 may be enhanced.

The first processor 51 can electrically connected to the electrochromic device 230, and the vehicle 50 may also control the optical properties of the electrochromic device 230.

Figure 15:
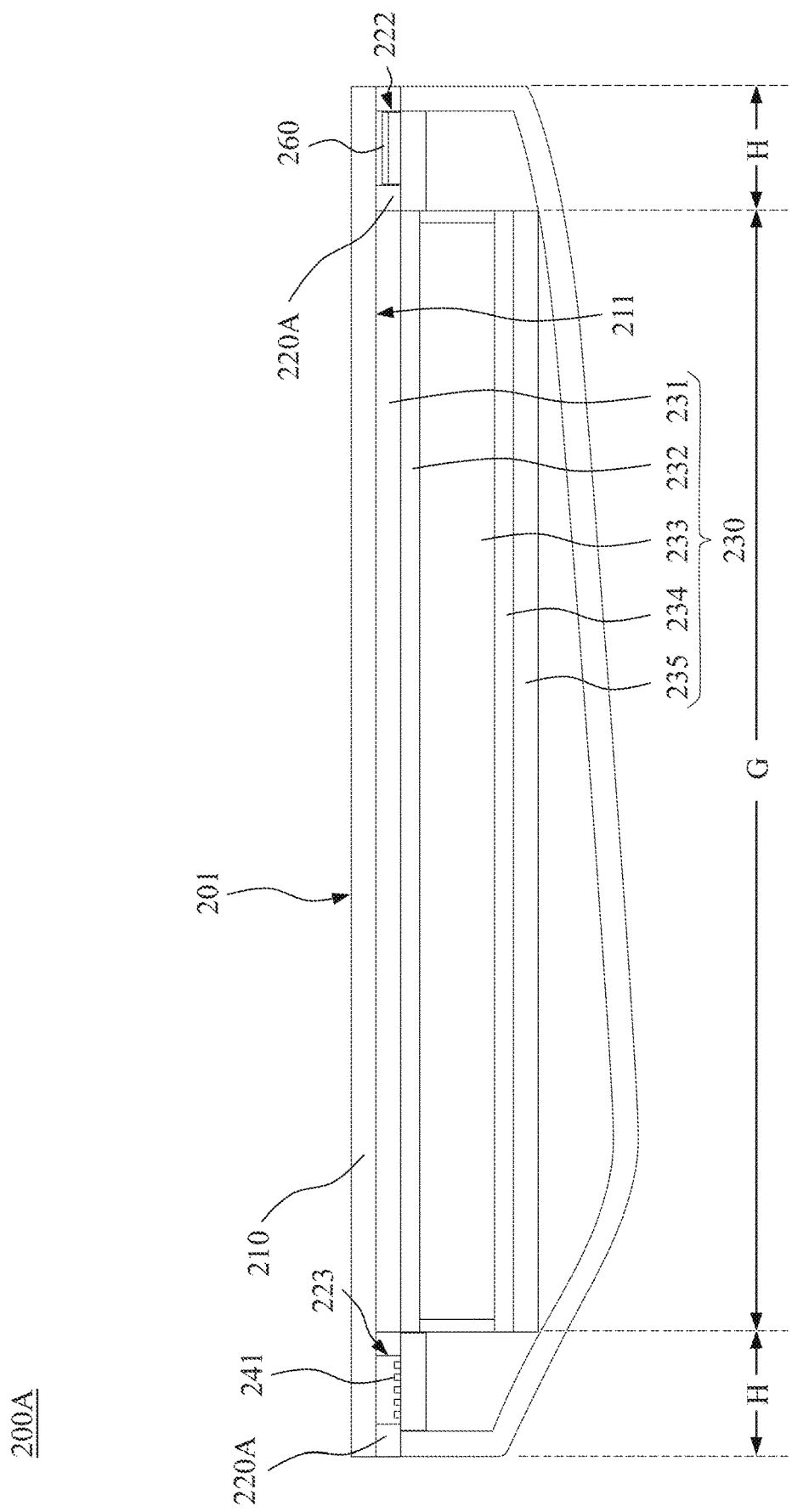
FIG. 15 is a schematic sectional view of an electrochromic mirror module of another embodiment of the present disclosure.

FIG. 15 is a sectional view of an electrochromic mirror module of another embodiment of the present disclosure. Please refer to FIG. 15, the electrochromic mirror module 200A is similar to the electrochromic mirror module 200 of the embodiment above, and descriptions of the same components will not be repeated.

The electrochromic mirror module 200A has a reflective layer 220A and sensor 260, which is different from the electrochromic mirror module 200. The reflective layer 220A has second opening 222. The sensor 260 is disposed in the second opening 222.

For example, the sensor 260 can be a radar obstacle detector, but the present disclosure is not limited thereto. In other embodiments, the sensor 260 can be an image sensor.

Since the reflective layer 220A is disposed on the second area H of the back surface 211, and the electrochromic device 230 is disposed on the first area G of the back surface 211, the sensor 260 of the embodiment can provide image-capturing function or obstacle detection. The sensor 260 may function as a dash camera without blocking the electrochromic device 230.

Moreover, the electrochromic mirror module 200A of the present disclosure may have a second light-emitting device 241, and the reflective layer 220A may have third opening 223. The second light-emitting device 241 is disposed in the third opening 223.

Figure 16:
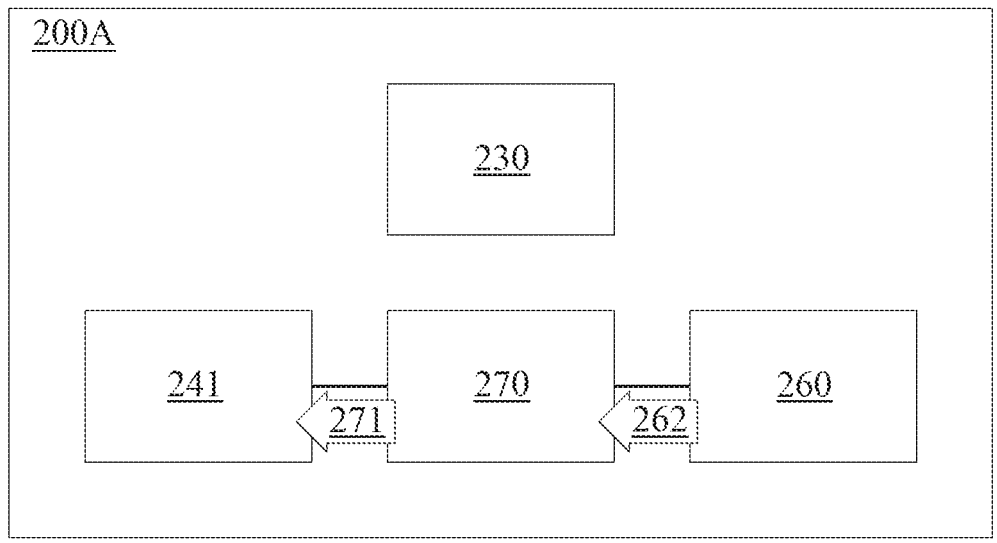
FIG. 16 is a schematic block diagram of an electrochromic mirror module of another embodiment of the present disclosure.

FIG. 16 is a block diagram of an electrochromic mirror module 200A of another embodiment of the present disclosure. Please refer to FIG. 16, the electrochromic mirror module 200A may have a second processor 270. The second processor 270 is electrically connected to the sensor 260 and the second light-emitting device 241. The second processor 270 is adapted to receive an alert signal 262 from the sensor 260, and the second processor 270 can provide a lighting signal 271 to the second light-emitting device 241 corresponding to the alert signal 262.

Therefore, when the electrochromic mirror module 200A is disposed on the exterior of the vehicle, the electrochromic device 230 helps the driver see areas behind the vehicle, and the sensor 260 can provide blind spot detection. When an obstacle is detected by the sensor 260, the second light-emitting device 241 will light up to inform the driver, and provide a safer driving environment.

Figure 17:
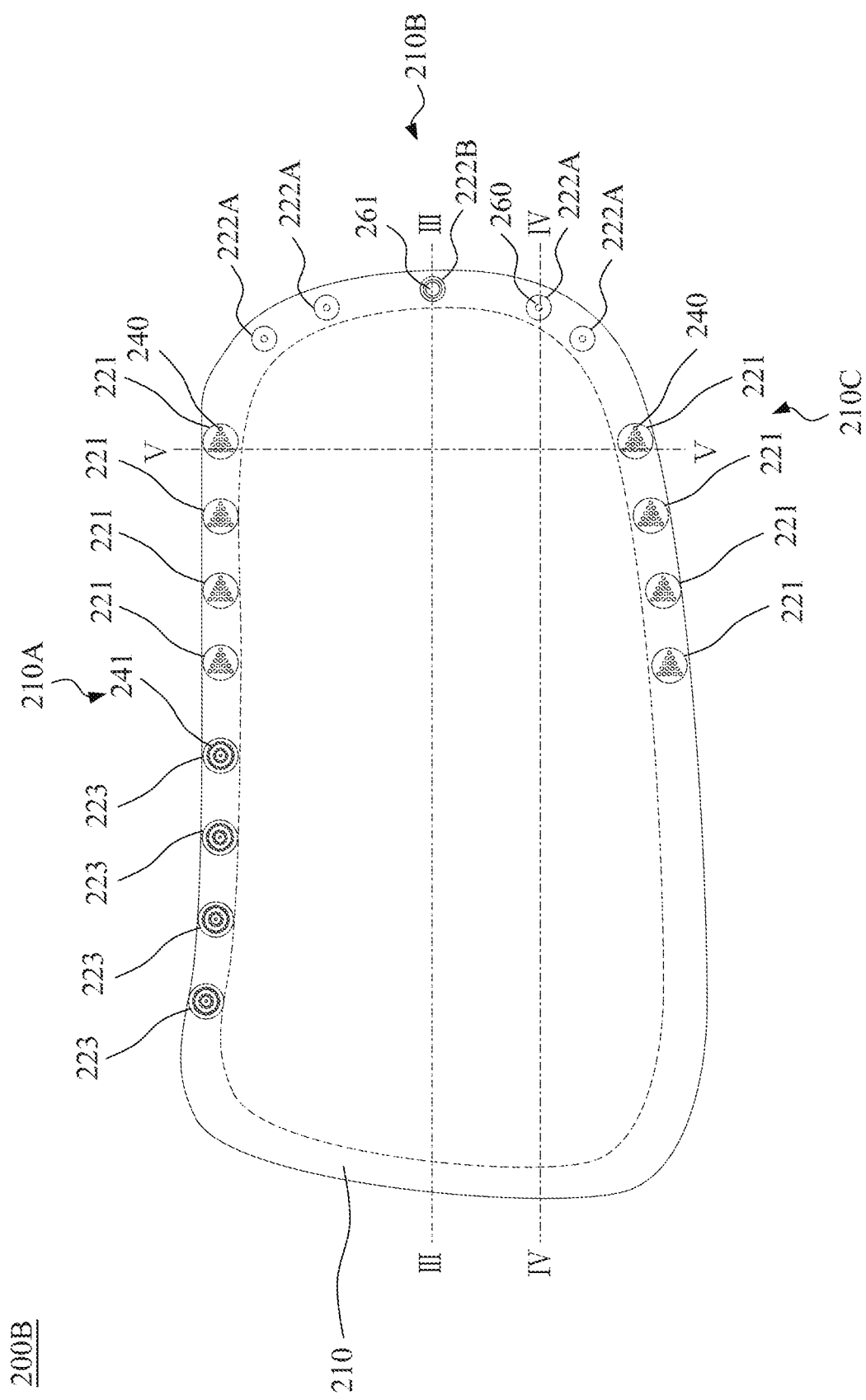
FIG. 17 is a schematic plan view of an electrochromic mirror module of still another embodiment of the present disclosure.
Figure 18:
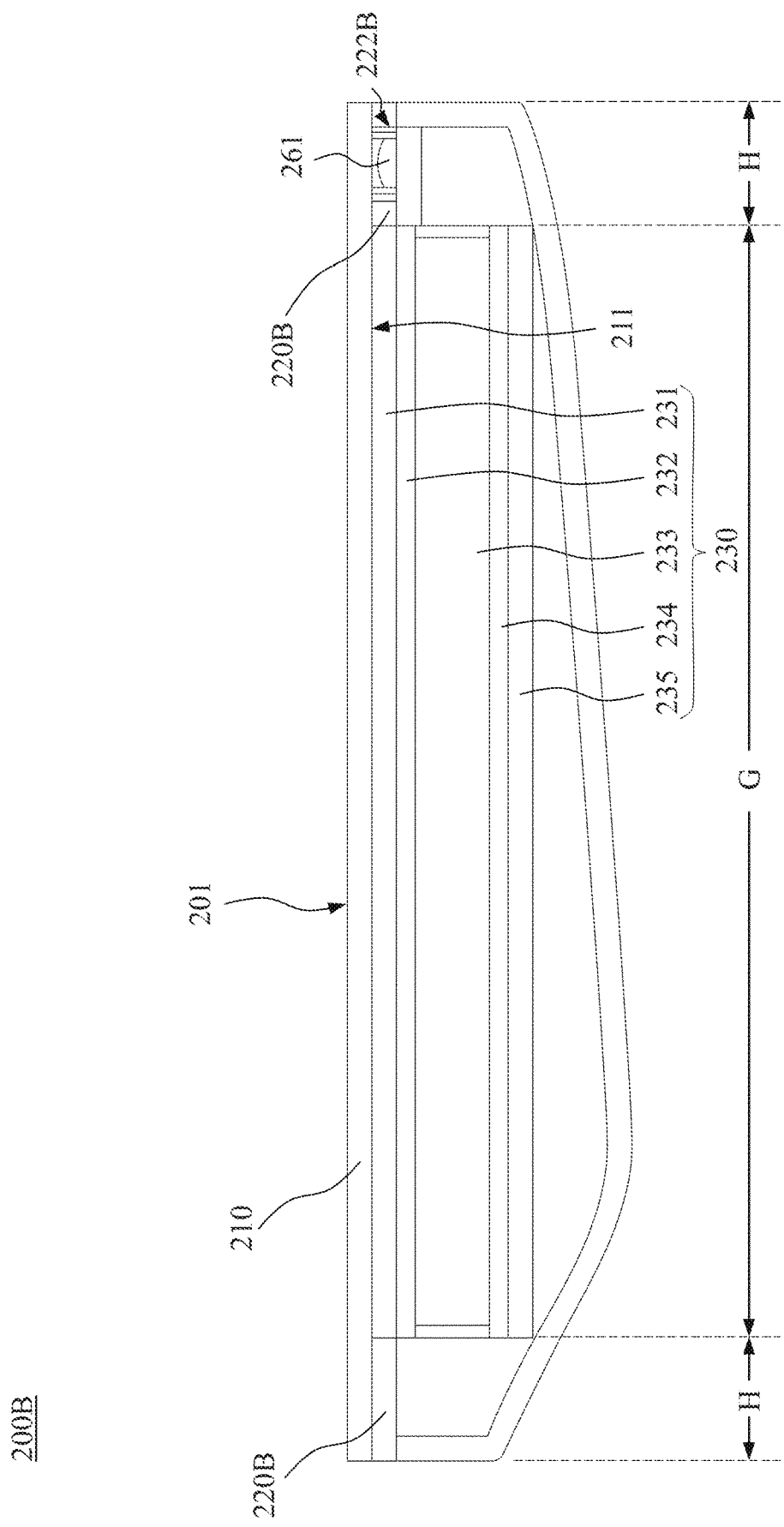
FIG. 18 is a schematic sectional view of the electrochromic mirror module taken along cutting plan line III in FIG. 17.
Figure 19:
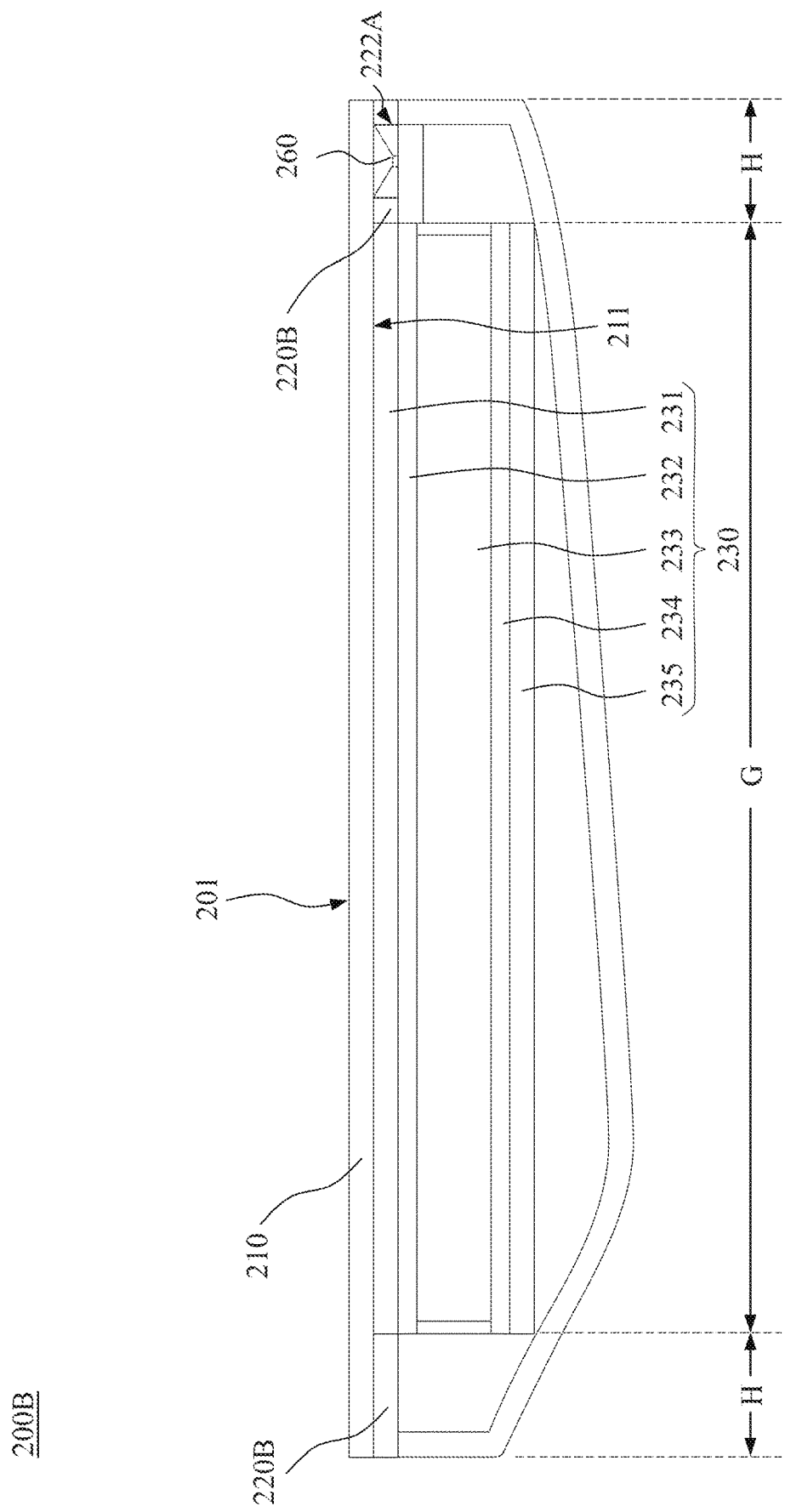
FIG. 19 is a schematic sectional view of the electrochromic mirror module taken along cutting plan line IV in FIG. 17.
Figure 20:
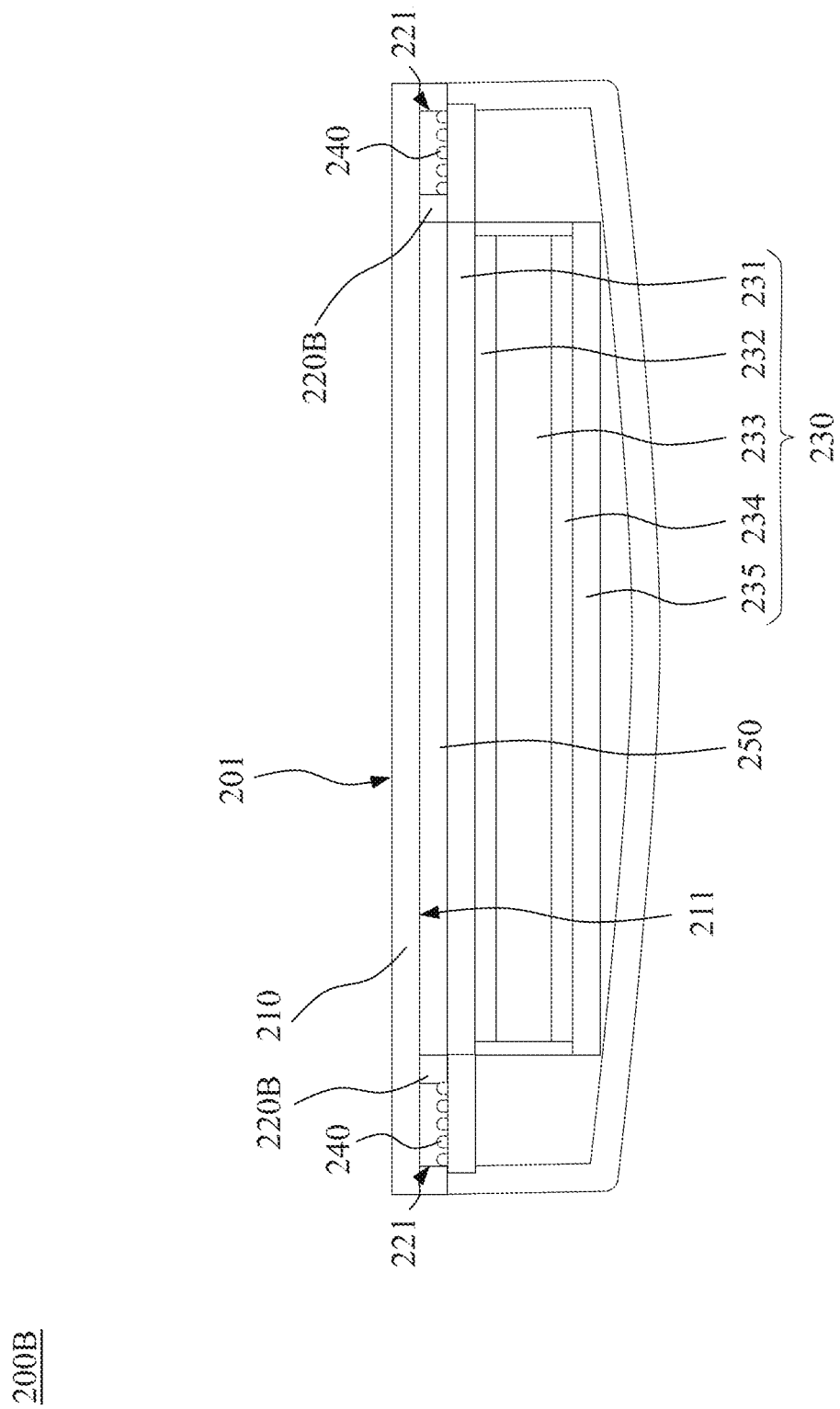
FIG. 20 is a schematic sectional view of the electrochromic mirror module take along cutting plan line V in FIG. 17.

FIG. 17 is a schematic plan view of an electrochromic mirror module of still another embodiment of the present disclosure, while components below the outer surface area illustrated with dash. FIG. 18 is a sectional view of the electrochromic mirror module taken along cutting plan line III in FIG. 17. FIG. 19 is a sectional view of the electrochromic mirror module taken along cutting plan line IV. FIG. 20 is a sectional view of the electrochromic mirror module taken along cutting plan line V. Please refer to FIG. 17, in still another embodiment, the electrochromic mirror module 200B is similar to the electrochromic mirror module 200 of the embodiment above, and descriptions of the same components will not be repeated. The electrochromic mirror module 200B has first light-transmissive substrate 210, electrochromic device 230, and adhesive layer 250. The first light-transmissive substrate 210 has a visible surface 201 and a back surface 211. The electrochromic device 230 has a second light-transmissive substrate 231, first controlling electrode 232, electrochromic layer 233, second controlling electrode 234, and rear substrate 235.

Please refer from FIG. 17 to FIG. 19, the electrochromic mirror module 200B has reflective layer 220B, sensor 260, and sensor 261, which is different from the electrochromic mirror module 200. The electrochromic device 230 is disposed in the first area G of the back surface 211, and the reflective layer 220B is disposed in the second area H of the back surface 211.

Please refer to FIG. 18 and FIG. 19, the reflective layer 220B has second opening 222A and second opening 222G, and the sensor 260 is disposed in the second opening 222A, and the sensor 261 is disposed in the second opening 222G.

Moreover, please refer to FIG. 17, the reflective layer 220B has a plurality of first openings 221 and a plurality of second openings 222A. The first openings 221 are adjacent to top 210A and bottom 210C of the first light-transmissive substrate 210. Please refer to FIG. 20, the first light-emitting device 240 are disposed in the first openings 221, and multiple first light-emitting device 240 can be arranged in each of the first openings 221.

Please refer to FIG. 17, the second openings 222A and the second openings 222B are adjacent to side 210B of the first light-transmissive substrate 210. To be specific, the electrochromic mirror module 200B has a plurality of sensors 260, and each of the sensors 260 may have a radar obstacle detector. Since the sensors 260 are disposed on the second openings 222A respectively, the electrochromic mirror module 200B can provide blind spot detection.

In the embodiment, the electrochromic mirror module 200B can have second light-emitting device 241, and the reflective layer 220B can have third opening 223. The second light-emitting device 241 can be disposed on the third opening 223. The second light-emitting device 241 of the embodiment is similar to the second light-emitting device 241 of the electrochromic mirror module 200A of the embodiment above, and the detailed description will not be repeated.

Moreover, the sensor 261 has an image sensor, and the sensor 261 may be disposed on the second opening 222B. Therefore, the electrochromic mirror module 200B may also function as a dash cam with the sensor 261.

The second opening 222A and the second opening 222B are adjacent to the side 210B of the first light-transmissive substrate 210, and the side 210B is away from the driver, and the second opening 222B is located between the second openings 222A, and, therefore; the sensor 260 and the sensor 261 have a proper detection area.

To sum up, the electrochromic mirror module of the present disclosure can provide turn signal, blind spot detection, and dash camera without affecting the operation area of the electrochromic device. The electrochromic mirror module can provide comprehensive complex functions.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrochromic mirror module, comprising:
a first light-transmissive substrate having a visible surface and a back surface disposed opposite to the visible surface;
an opaque touch sensing layer being disposed on the back surface;
an electrochromic device being disposed on the back surface with the opaque touch sensing layer;
a second light-transmissive substrate, wherein the opaque touch sensing layer is disposed between the first light-transmissive substrate and the second light-transmissive substrate; and
a reflective substrate having a reflective layer, and material of the reflective layer includes coating material, and the coating material includes silver, copper, titanium, molybdenum, aluminum, or alloy combined with one or plurality of the materials above, and the first light-transmissive substrate, the second light-transmissive substrate, and the reflective substrate are stacked and the second light-transmissive substrate is disposed between the reflective substrate and the first light-transmissive substrate, and an incident light from outside enters through the visible surface of the first light-transmissive substrate, and the reflective substrate reflects the incident light, and the reflected incident light exits form the visible surface of the first light-transmissive substrate, and reflectance of the electrochromic device is larger than 40%, and the electrochromic device has a first controlling electrode, an electrochromic layer, and a second controlling electrode, and transmittance of the electrochromic layer is larger than 15%,
wherein, on the back surface, an area where the opaque touch sensing layer is disposed and an area where the electrochromic device is disposed are different.

2. The electrochromic mirror module of claim 1, wherein a distribution area of the opaque touch sensing layer on the back surface is corresponded to peripheral of the visible surface, and rest of the visible surface is corresponded to the electrochromic device.

3. The electrochromic mirror module of claim 1, wherein a distribution area of the opaque touch sensing layer on the back surface and a distribution area of the electrochromic device on the back surface overlap each other.

4. The electrochromic mirror module of claim 1, wherein the visible surface is a full mirror surface.

5. The electrochromic mirror module of claim 1 further including a case, wherein the case has a side wall surrounding the first light-transmissive substrate, and the side wall has a front casing surface which is aligned with the visible surface.

6. The electrochromic mirror module of claim 1, wherein the opaque touch sensing layer comprises:
a patterned metal electrode having a hollow area, disposed on the back surface of the first light-transmissive substrate; and
a connecting circuit, electrically connected to the patterned metal electrode.

7. The electrochromic mirror module of claim 6, wherein the opaque touch sensing layer has a plurality of operation areas and a plurality of patterned metal electrodes, and the operation areas are separate, and the patterned metal electrodes are disposed in the operation areas respectively.

8. An electrochromic mirror module, comprising:
a first light-transmissive substrate having a visible surface and a back surface, wherein the back surface is disposed opposite to the visible surface, and the back surface has a first area and a second area; and
a reflective layer being disposed on the second area of the back surface, wherein the reflective layer has at least one first opening;
an electrochromic device being disposed on the first area of the back surface; and
at least one first light-emitting device being disposed at the first opening.

9. The electrochromic mirror module of claim 8, wherein the second area of the back surface is corresponded to peripheral of the visible surface, and the first area of the back surface is corresponded to the rest of the visible surface.

10. The electrochromic mirror module of claim 8, wherein the visible surface is a full mirror surface.

11. The electrochromic mirror module of claim 8 further including a case, wherein the case is connected to the back surface of the first light-transmissive substrate, and the case has an accommodation space, and the accommodation space accommodates the electrochromic device and the first light-emitting device.

12. The electrochromic mirror module of claim 8, wherein the first light-emitting device is electrically connected to a first processor, and the first light-emitting device is adapted to receive a turn signal from the first processor.

13. The electrochromic mirror module of claim 8 further including a sensor, wherein the reflective layer has a second opening, and the sensor is disposed at the second opening.

14. The electrochromic mirror module of claim 13 further including:
    at least one second light-emitting device; and
    a second processor electrically connected to the sensor and the second light-emitting device,
    wherein the reflective layer has at least one third opening, and the second light-emitting device is disposed at the third opening, and the second processor is adapted to receive an alert from the sensor, and the second processor provide a lighting signal to the second light-emitting device according to the alert.

15. An electrochromic mirror module, comprising:
    a first light-transmissive substrate having a visible surface and a back surface, wherein the back surface is disposed opposite to the visible surface, and the back surface has a first area and a second area;
    a reflective layer being disposed on the second area of the back surface, wherein the reflective layer has at least one second opening;
    an electrochromic device being disposed on the first area of the back surface; and
    at least one sensor being disposed at the second opening.

16. The electrochromic mirror module of claim 15, wherein the second area of the back surface is corresponded to peripheral of the visible surface, and the first area of the back surface is corresponded to the rest of the visible surface.

17. The electrochromic mirror module of claim 15, wherein the visible surface is a full mirror surface.

18. The electrochromic mirror module of claim 15 further including a case, wherein the case is connected to the back surface of the first light-transmissive substrate, and the case has an accommodation space, and the accommodation space accommodates the electrochromic device and the sensor.

19. The electrochromic mirror module of claim 15 further including:
    at least one second light-emitting device, and
    a second processor electrically connected to the sensor and the second light-emitting device,
    wherein the reflective layer has at least one third opening, and the second light-emitting device is disposed at the third opening, and the second processor is adapted to receive an alert from the sensor, and the second process provide a lighting signal to the second light-emitting device according to the alert.

* * * * *